(12) United States Patent
Mannella et al.

(10) Patent No.: US 8,985,497 B2
(45) Date of Patent: Mar. 24, 2015

(54) CONSUMABLE ASSEMBLY WITH PAYOUT TUBE FOR ADDITIVE MANUFACTURING SYSTEM

(75) Inventors: Dominic F. Mannella, Minnetonka, MN (US); William J. Swanson, St. Paul, MN (US); Kevin C. Johnson, Minneapolis, MN (US); J. Samuel Batchelder, Somers, NY (US)

(73) Assignee: Stratasys, Inc., Eden Prairie, MN (US)

( * ) Notice: Subject to any disclaimer, the term of this patent is extended or adjusted under 35 U.S.C. 154(b) by 475 days.

(21) Appl. No.: 13/334,921

(22) Filed: Dec. 22, 2011

(65) Prior Publication Data

US 2013/0161432 A1    Jun. 27, 2013

(51) Int. Cl.
| | | |
|---|---|---|
| *B65H 23/04* | (2006.01) | |
| *B65H 55/02* | (2006.01) | |
| *B65H 57/12* | (2006.01) | |
| *B65H 23/02* | (2006.01) | |

(52) U.S. Cl.
CPC ............ *B65H 57/12* (2013.01); *B65H 23/02* (2013.01)
USPC ...................................... 242/615.3; 242/171

(58) Field of Classification Search
USPC ...................................... 242/171, 172, 615.3
See application file for complete search history.

(56) References Cited

U.S. PATENT DOCUMENTS

| | | | |
|---|---|---|---|
| 2,767,938 A | 10/1956 | Taylor, Jr. | |
| 3,877,661 A | 4/1975 | Newman | |
| 4,009,845 A * | 3/1977 | Santucci et al. | ........... 242/129.7 |
| 4,057,203 A * | 11/1977 | Newman et al. | ............... 242/163 |
| 4,160,533 A | 7/1979 | Kotzur et al. | |
| 4,162,050 A * | 7/1979 | Wagner et al. | ................. 242/163 |
| 4,274,607 A * | 6/1981 | Priest | .............................. 242/163 |
| 4,367,853 A * | 1/1983 | Kotzur | ........................... 242/163 |
| 4,406,419 A | 9/1983 | Kotzur | |
| 4,523,723 A | 6/1985 | Kotzur | |
| 4,741,495 A | 5/1988 | Kotzur | |
| 4,749,347 A | 6/1988 | Valavaara | |
| 5,064,136 A * | 11/1991 | Hunt | .......................... 242/157 R |
| 5,079,899 A | 1/1992 | Kurachi | |
| 5,100,078 A * | 3/1992 | Clark | ............................ 242/171 |
| 5,121,329 A | 6/1992 | Crump | |
| 5,150,852 A * | 9/1992 | Hunt et al. | ................. 242/157 R |
| 5,152,476 A * | 10/1992 | Moser | ........................ 242/157 R |
| 5,303,141 A | 4/1994 | Batchelder et al. | |
| 5,312,224 A | 5/1994 | Batchelder et al. | |
| 5,340,433 A | 8/1994 | Crump | |
| 5,368,245 A * | 11/1994 | Fore | ........................... 242/157 R |
| 5,426,722 A | 6/1995 | Batchelder | |

(Continued)

FOREIGN PATENT DOCUMENTS

WO    WO 2009088995 A1 *    7/2009   .............. G06F 19/00

OTHER PUBLICATIONS

Brochure, Reelex Packaging Guide, Guidelines and Recommendations, Reelex Packaging Solutions, Inc., May 2010.

*Primary Examiner* — Emmanuel M Marcelo
*Assistant Examiner* — Justin Stefanon
(74) *Attorney, Agent, or Firm* — Brian R. Morrison; Westman, Champlin & Koehler, P.A.

(57) ABSTRACT

A payout tube for enabling payout of a consumable filament from a consumable assembly that is configured for use with an additive manufacturing system, the payout tube comprising a tip end having an inlet opening, a base end having an outlet opening, and a tube body having an average effective outer diameter that is substantially greater than an effective inner diameter of the inlet opening.

20 Claims, 36 Drawing Sheets

(56) References Cited

U.S. PATENT DOCUMENTS

| | | | | |
|---|---|---|---|---|
| 5,470,026 A | * | 11/1995 | Kotzur | 242/478.2 |
| 5,503,785 A | | 4/1996 | Crump et al. | |
| 5,520,347 A | * | 5/1996 | Bass et al. | 242/157 R |
| 5,653,925 A | | 8/1997 | Batchelder | |
| 5,738,817 A | | 4/1998 | Danforth et al. | |
| 5,764,521 A | | 6/1998 | Batchelder et al. | |
| 5,866,058 A | | 2/1999 | Batchelder et al. | |
| 5,939,008 A | | 8/1999 | Comb et al. | |
| 5,968,561 A | | 10/1999 | Batchelder et al. | |
| 5,979,812 A | | 11/1999 | Kotzur et al. | |
| 6,004,124 A | | 12/1999 | Swanson et al. | |
| 6,022,207 A | | 2/2000 | Dahlin et al. | |
| 6,028,410 A | | 2/2000 | Leavitt et al. | |
| 6,054,077 A | | 4/2000 | Comb et al. | |
| 6,067,480 A | | 5/2000 | Stuffle et al. | |
| 6,070,107 A | | 5/2000 | Lombardi et al. | |
| 6,085,957 A | | 7/2000 | Zinniel et al. | |
| 6,086,012 A | * | 7/2000 | Kotzur et al. | 242/588.4 |
| 6,109,554 A | | 8/2000 | Kotzur et al. | |
| 6,129,872 A | | 10/2000 | Jang | |
| 6,228,923 B1 | | 5/2001 | Lombardi et al. | |
| 6,250,735 B1 | | 6/2001 | Kaneko et al. | |
| 6,328,238 B1 | * | 12/2001 | Chism | 242/171 |
| 6,341,741 B1 | | 1/2002 | Kotzur et al. | |
| 6,491,163 B1 | * | 12/2002 | Grcic et al. | 206/403 |
| 6,547,995 B1 | | 4/2003 | Comb | |
| 6,629,011 B1 | | 9/2003 | Calderon et al. | |
| 6,645,412 B2 | | 11/2003 | Priedeman, Jr. | |
| 6,685,866 B2 | | 2/2004 | Swanson et al. | |
| 6,702,213 B2 | | 3/2004 | Kotzur et al. | |
| 6,722,872 B1 | | 4/2004 | Swanson et al. | |
| 6,749,414 B1 | | 6/2004 | Hanson et al. | |
| 6,776,602 B2 | | 8/2004 | Swanson et al. | |
| 6,790,403 B1 | | 9/2004 | Priedeman, Jr. et al. | |
| 6,814,907 B1 | | 11/2004 | Comb | |
| 6,866,807 B2 | | 3/2005 | Comb et al. | |
| 6,869,559 B2 | | 3/2005 | Hopkins | |
| 6,923,634 B2 | | 8/2005 | Swanson et al. | |
| 6,998,087 B1 | | 2/2006 | Hanson et al. | |
| 7,063,285 B1 | | 6/2006 | Turley et al. | |
| 7,122,246 B2 | | 10/2006 | Comb et al. | |
| 7,156,334 B1 | * | 1/2007 | Fore et al. | 242/171 |
| 7,169,337 B2 | | 1/2007 | Swanson et al. | |
| 7,172,715 B2 | * | 2/2007 | Swanson et al. | 264/39 |
| 7,249,726 B2 | | 7/2007 | Kotzur | |
| 7,297,304 B2 | | 11/2007 | Swanson et al. | |
| 7,309,038 B2 | | 12/2007 | Carroscia | |
| 7,314,591 B2 | | 1/2008 | Priedeman, Jr. | |
| 7,341,214 B2 | | 3/2008 | Taatjes et al. | |
| 7,384,255 B2 | | 6/2008 | LaBossiere et al. | |
| 7,604,470 B2 | | 10/2009 | LaBossiere et al. | |
| 7,625,200 B2 | | 12/2009 | Leavitt | |
| 2005/0173838 A1 | | 8/2005 | Priedeman et al. | |
| 2005/0224615 A1 | * | 10/2005 | Miller et al. | 242/171 |
| 2007/0228590 A1 | | 10/2007 | LaBossiere et al. | |
| 2007/0228592 A1 | | 10/2007 | Dunn et al. | |
| 2008/0169585 A1 | | 7/2008 | Zinniel | |
| 2009/0035405 A1 | | 2/2009 | Leavitt | |
| 2009/0263582 A1 | | 10/2009 | Batchelder | |
| 2009/0273122 A1 | | 11/2009 | Batchelder et al. | |
| 2009/0274540 A1 | | 11/2009 | Batchelder et al. | |
| 2010/0021580 A1 | | 1/2010 | Swanson et al. | |
| 2010/0096072 A1 | | 4/2010 | Hopkins et al. | |
| 2010/0096485 A1 | | 4/2010 | Taatjes et al. | |
| 2010/0096489 A1 | | 4/2010 | Taatjes et al. | |
| 2010/0100224 A1 | | 4/2010 | Comb et al. | |
| 2010/0283172 A1 | | 11/2010 | Swanson | |
| 2011/0074065 A1 | | 3/2011 | Batchelder et al. | |
| 2011/0076495 A1 | | 3/2011 | Batchelder et al. | |
| 2011/0076496 A1 | | 3/2011 | Batchelder et al. | |
| 2011/0117268 A1 | | 5/2011 | Batchelder et al. | |
| 2011/0121476 A1 | | 5/2011 | Batchelder et al. | |
| 2011/0233804 A1 | | 9/2011 | Batchelder et al. | |
| 2012/0018924 A1 | | 1/2012 | Swanson et al. | |
| 2012/0068378 A1 | | 3/2012 | Swanson et al. | |
| 2012/0070523 A1 | | 3/2012 | Swanson et al. | |

\* cited by examiner

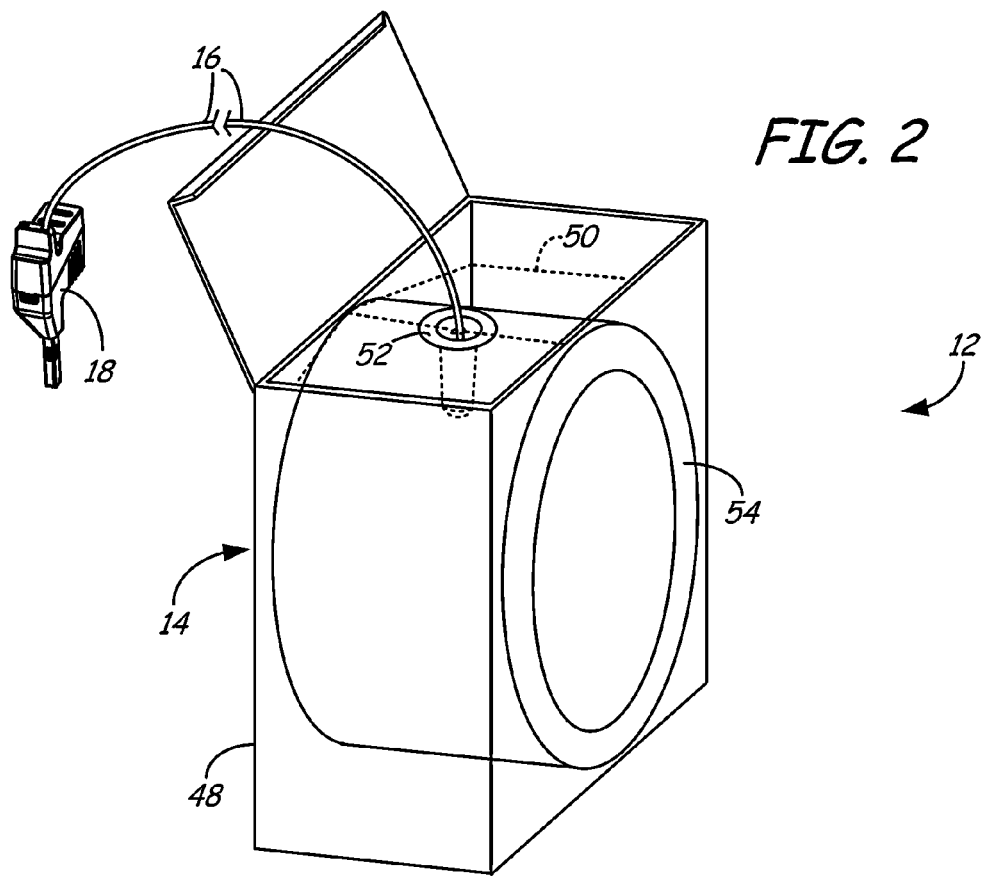
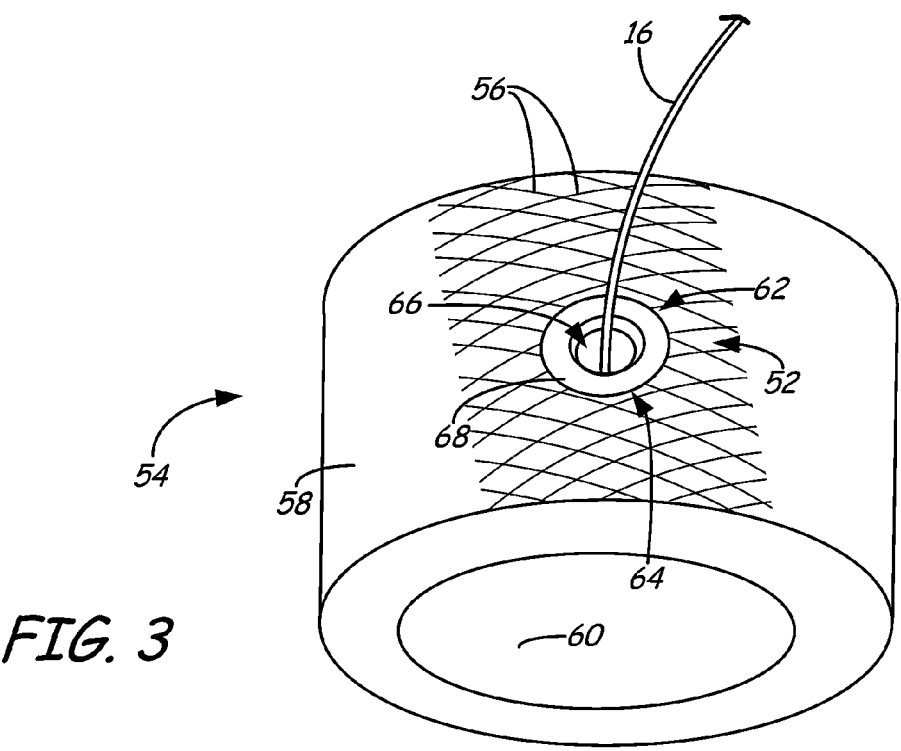

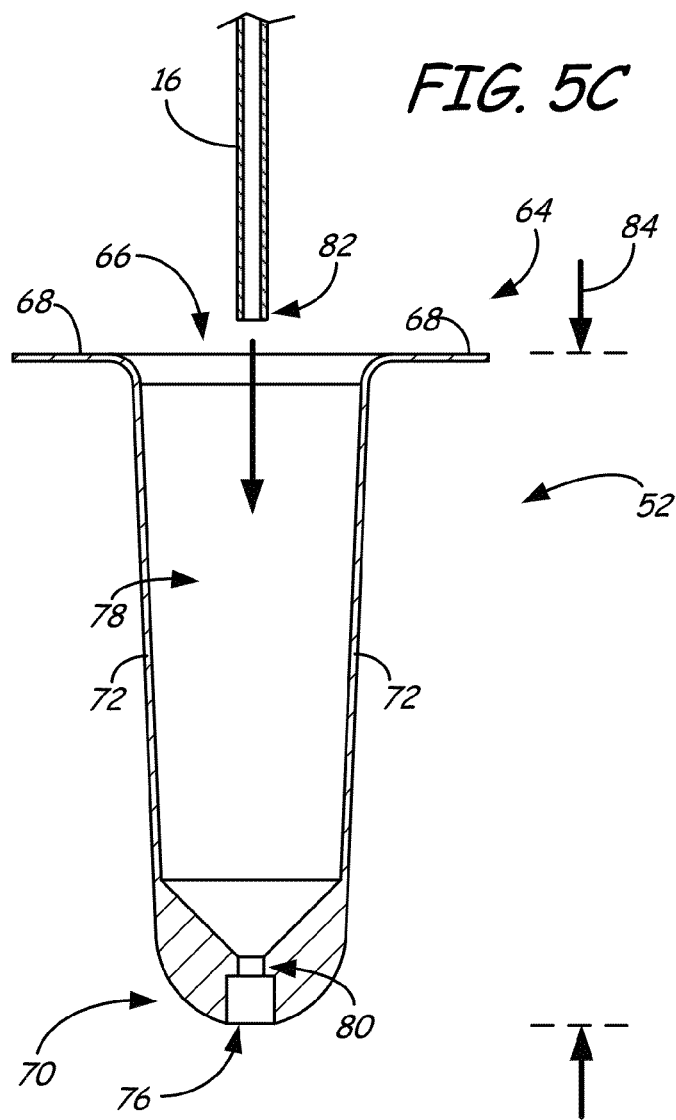
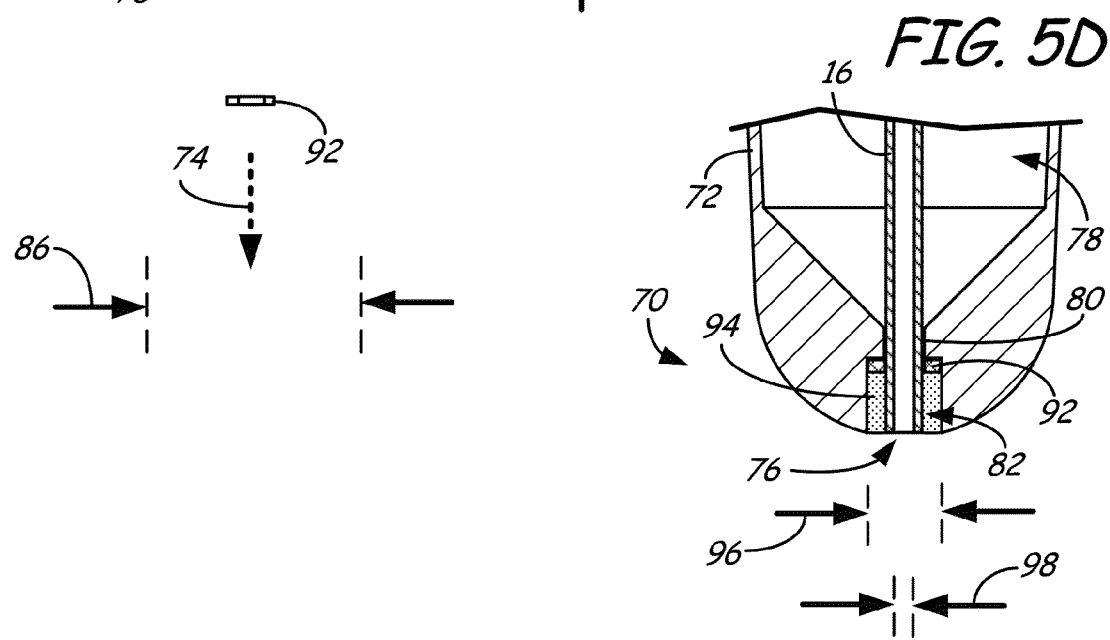
FIG. 5C
FIG. 5D

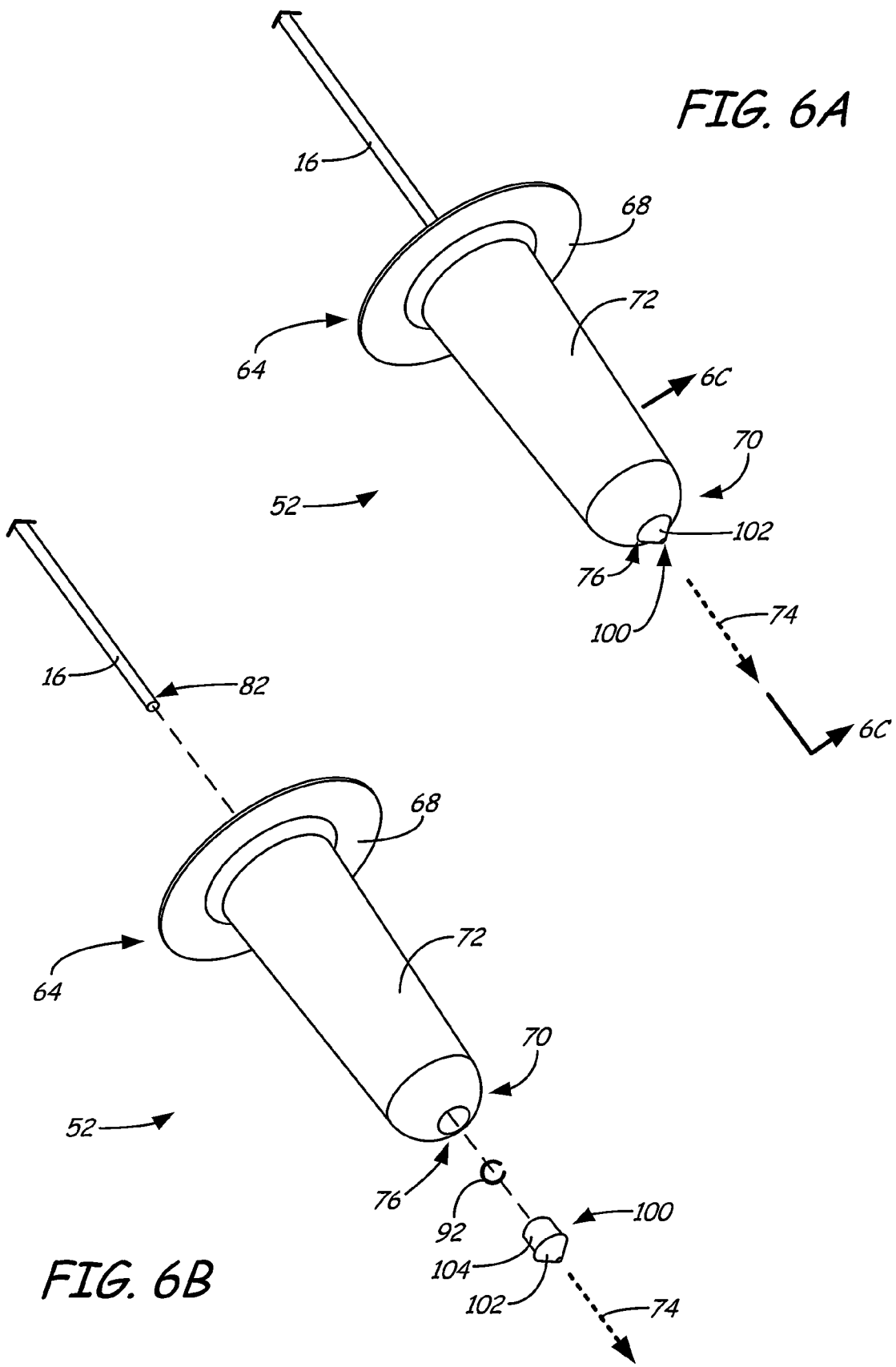

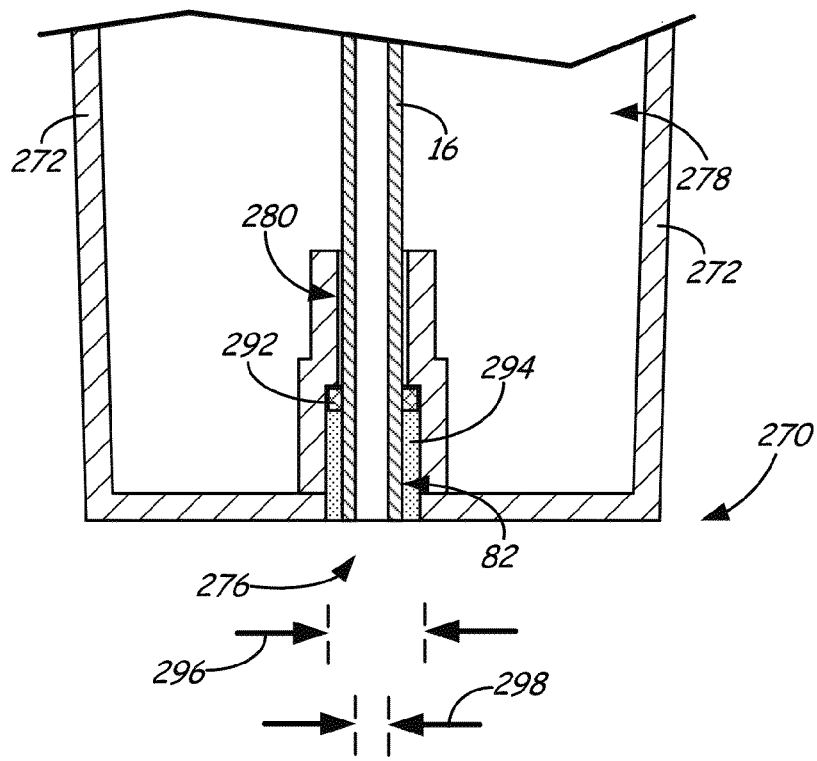
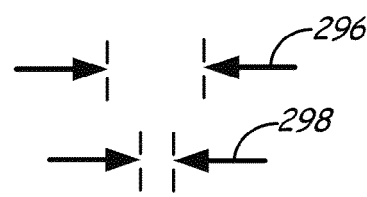
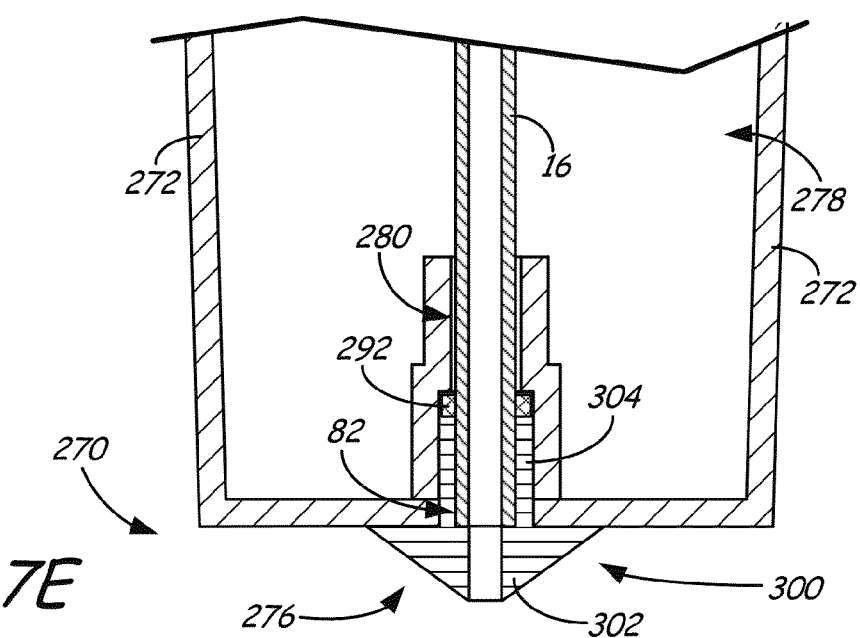

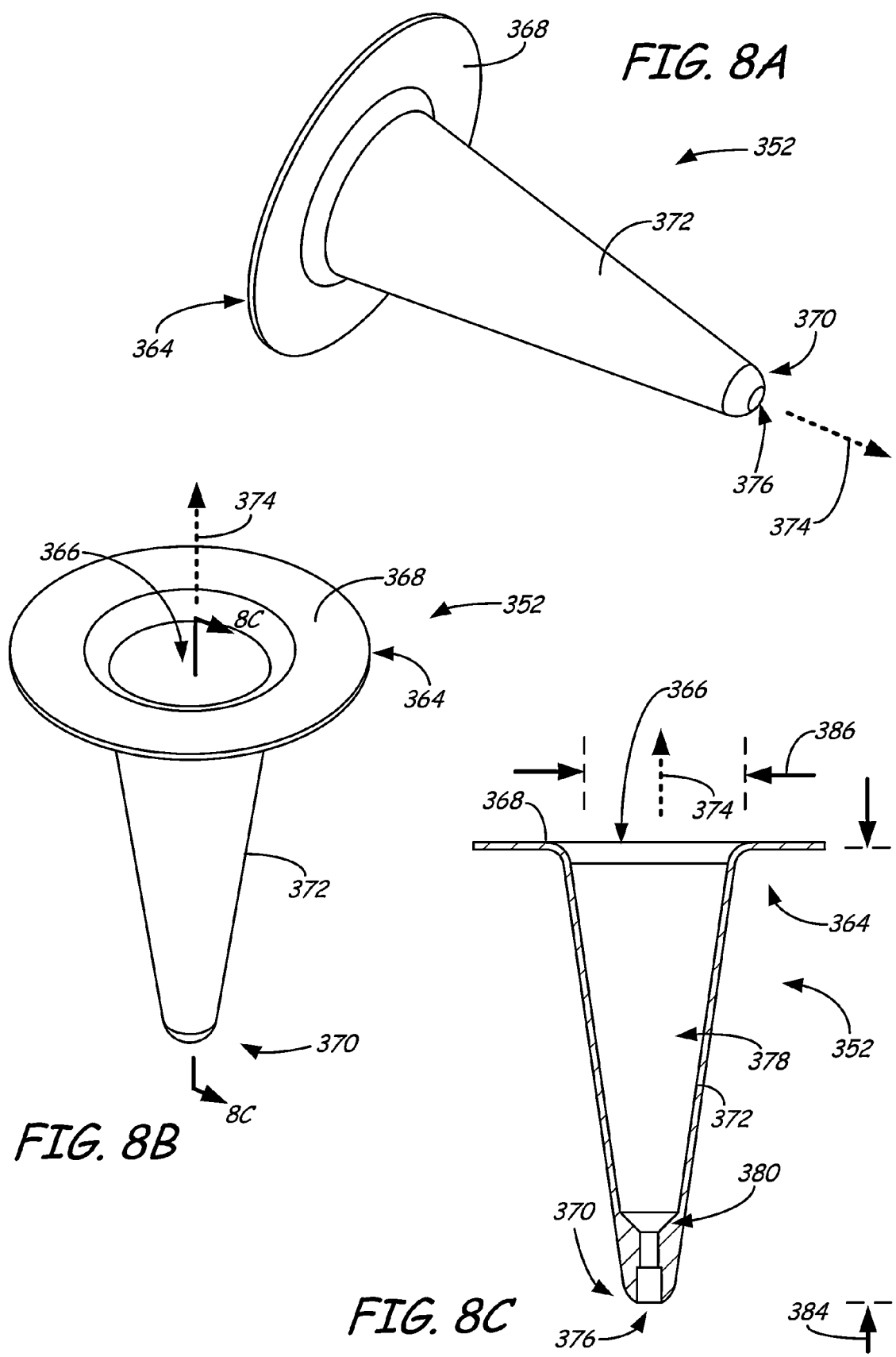

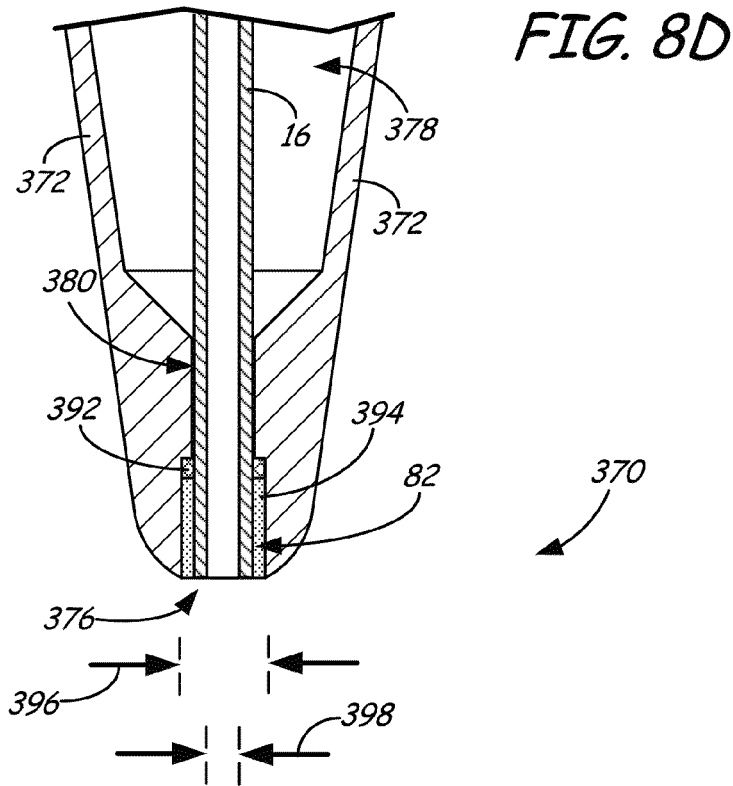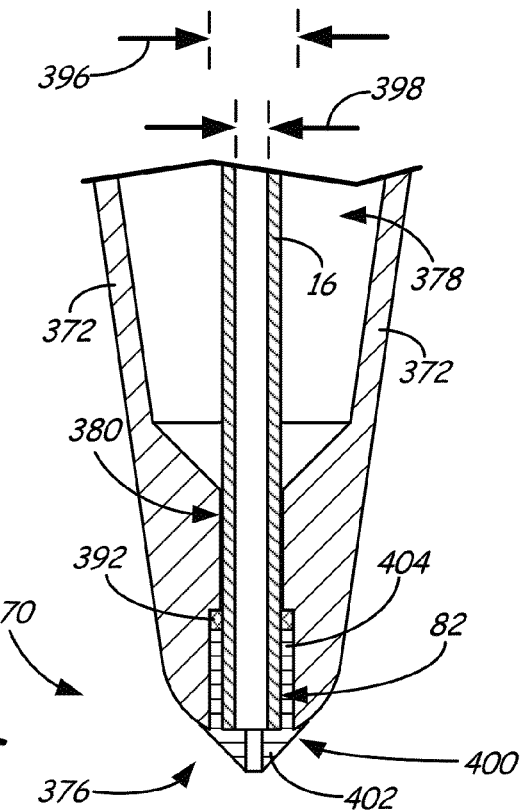

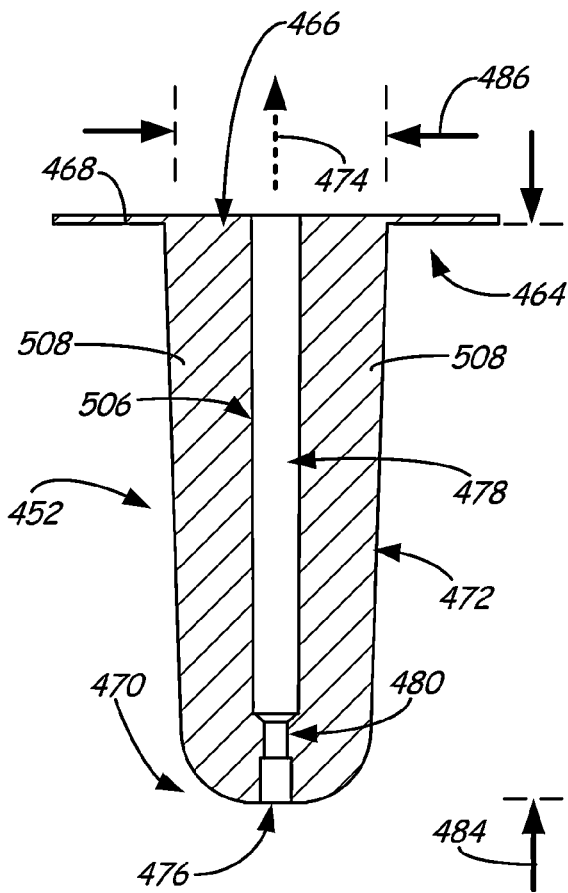
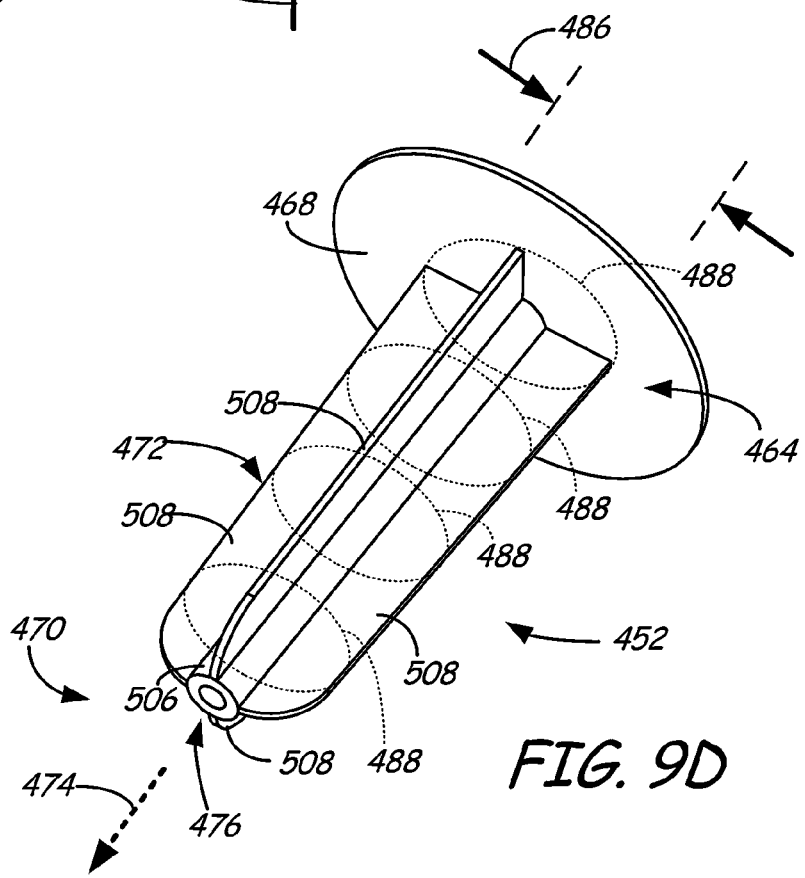

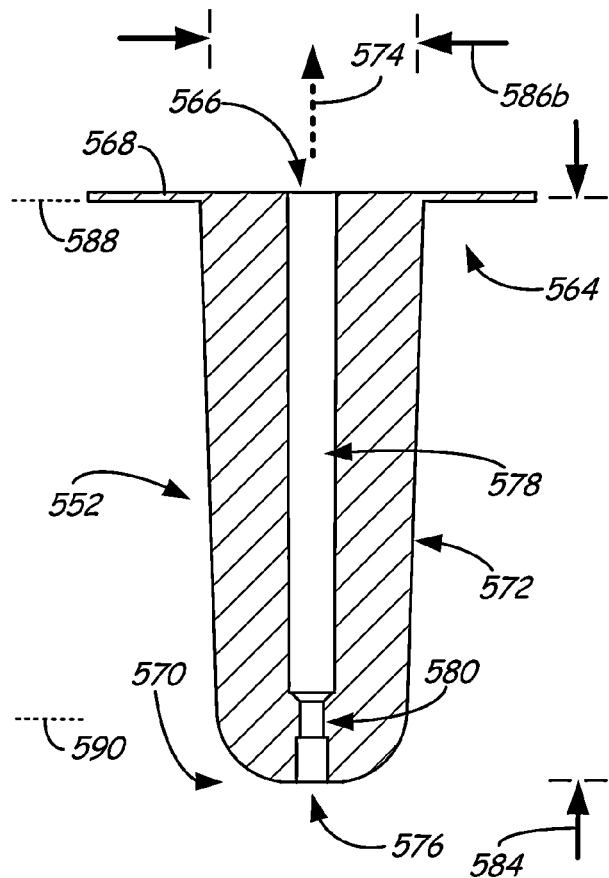
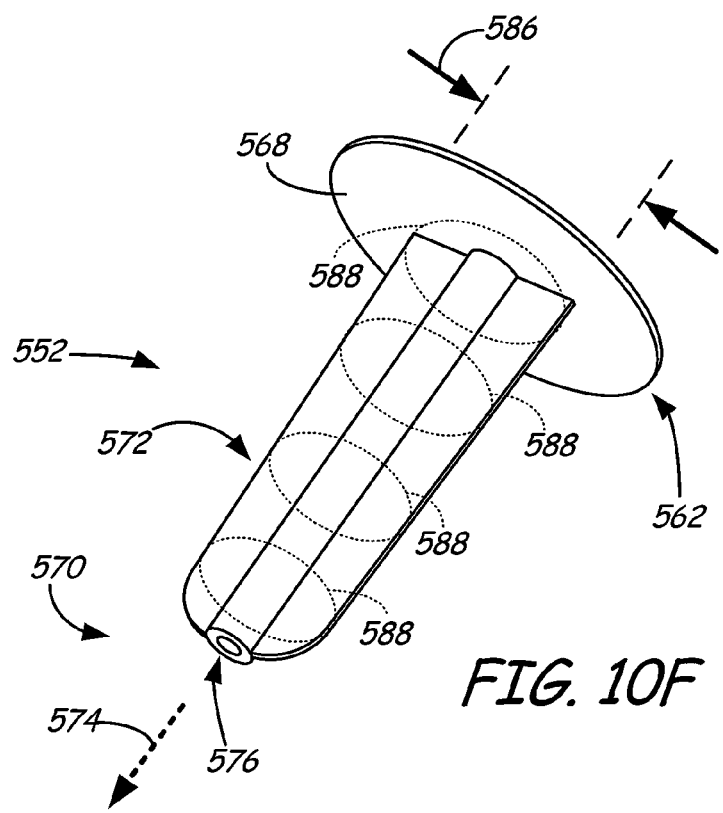

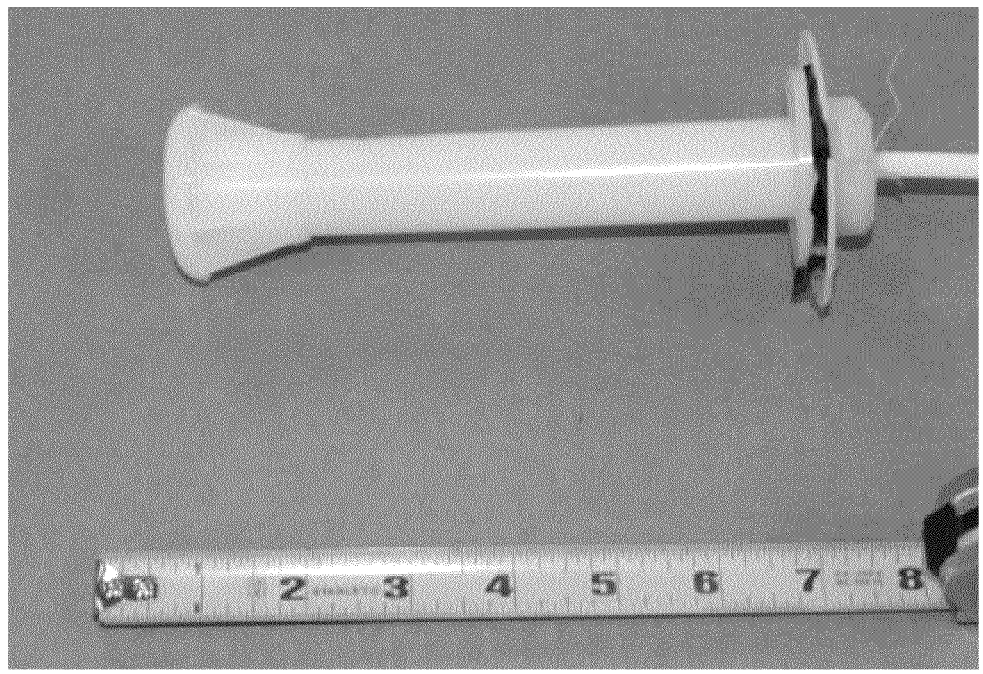
FIG. 13A
FIG. 13B
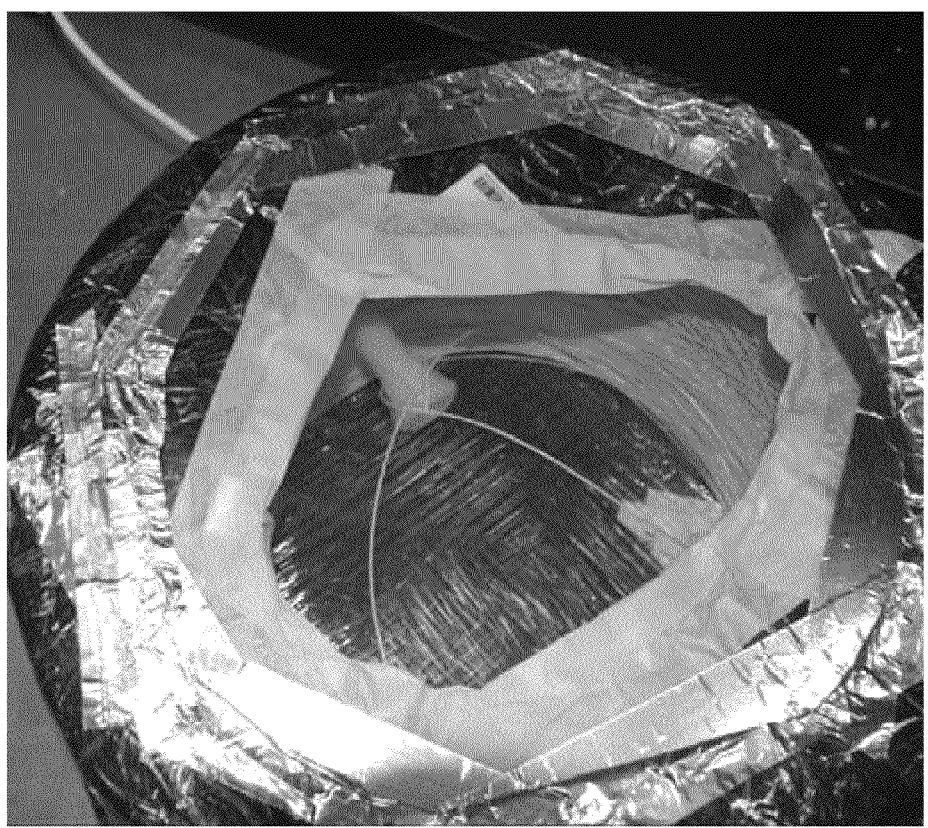

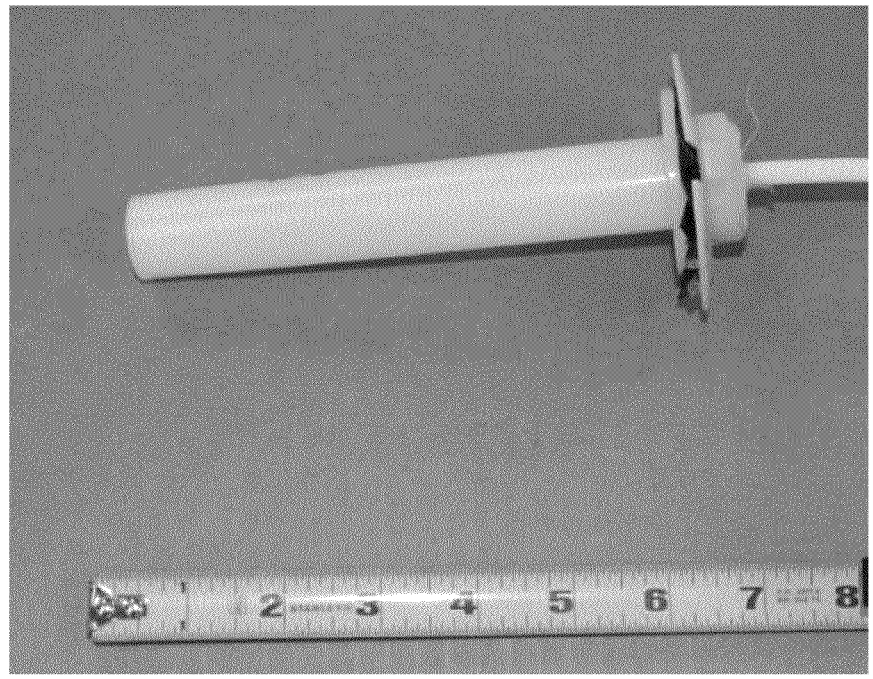
FIG. 14A
FIG. 14B
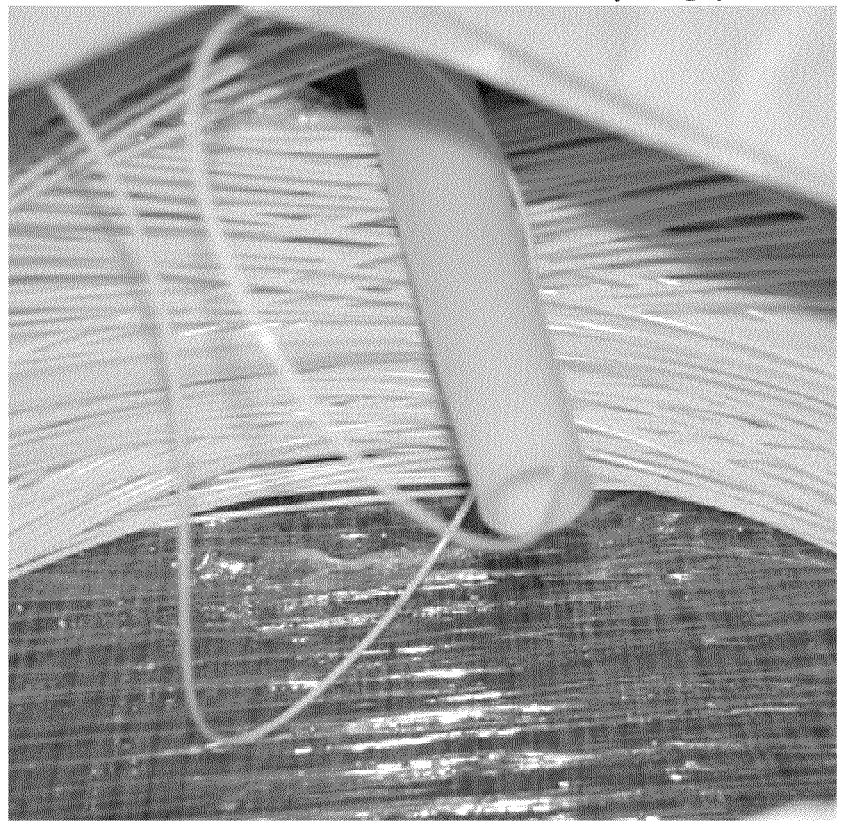

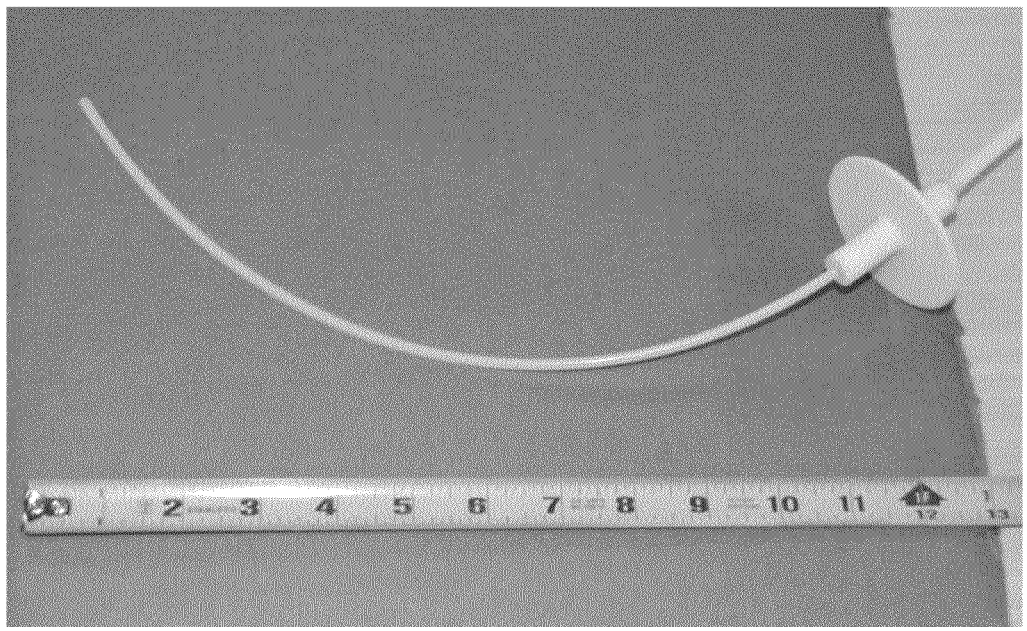
FIG. 16A
FIG. 16B
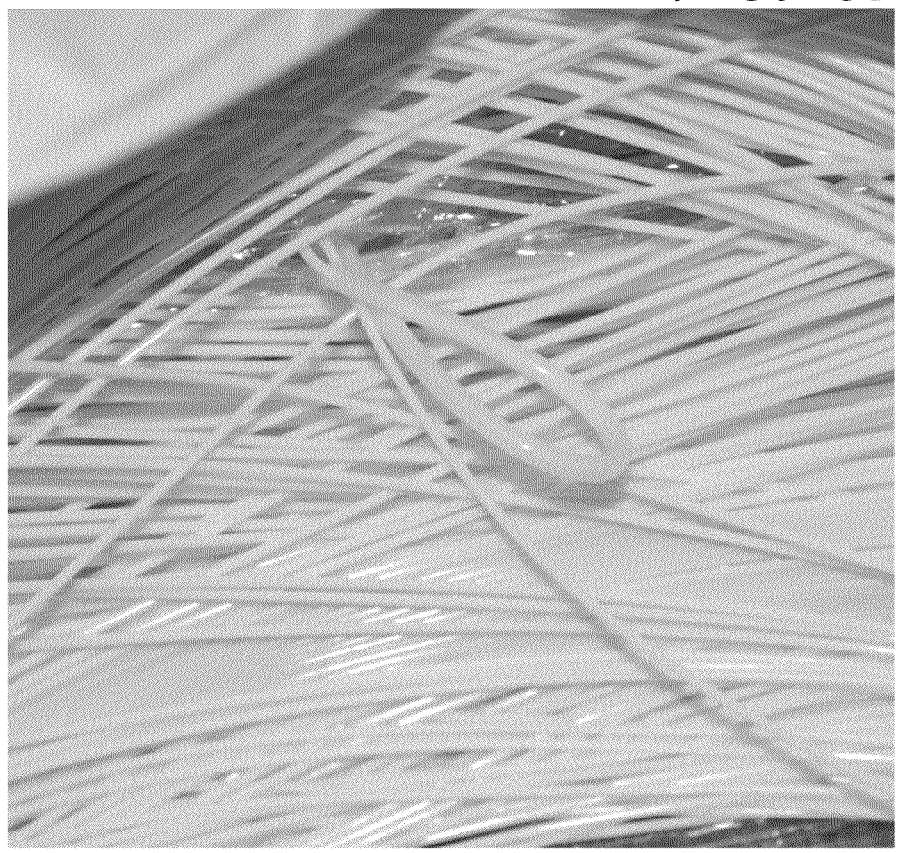

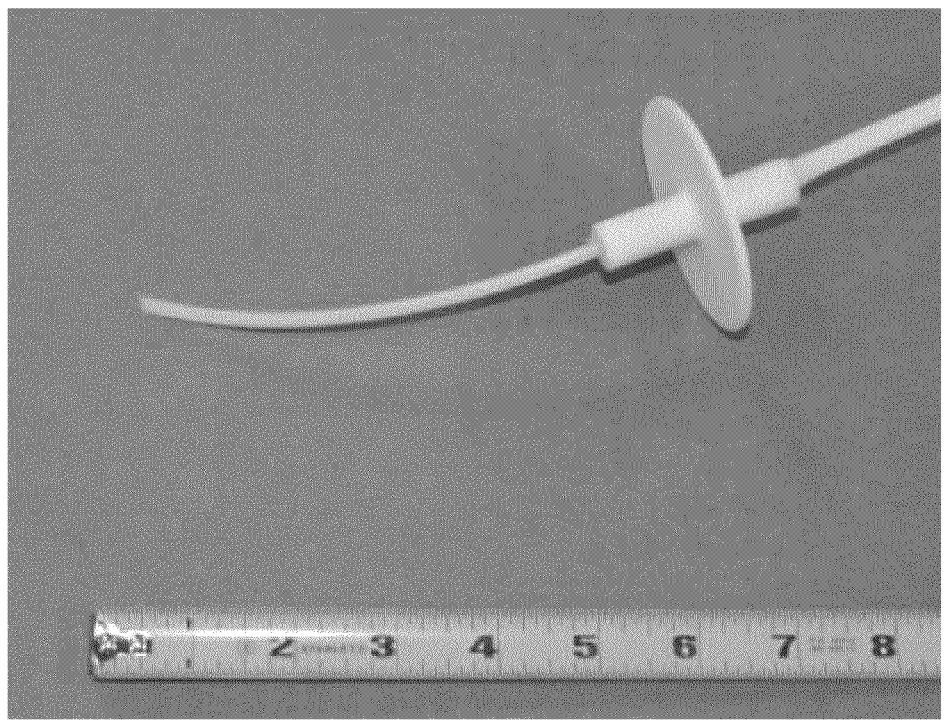
FIG. 17A
FIG. 17B
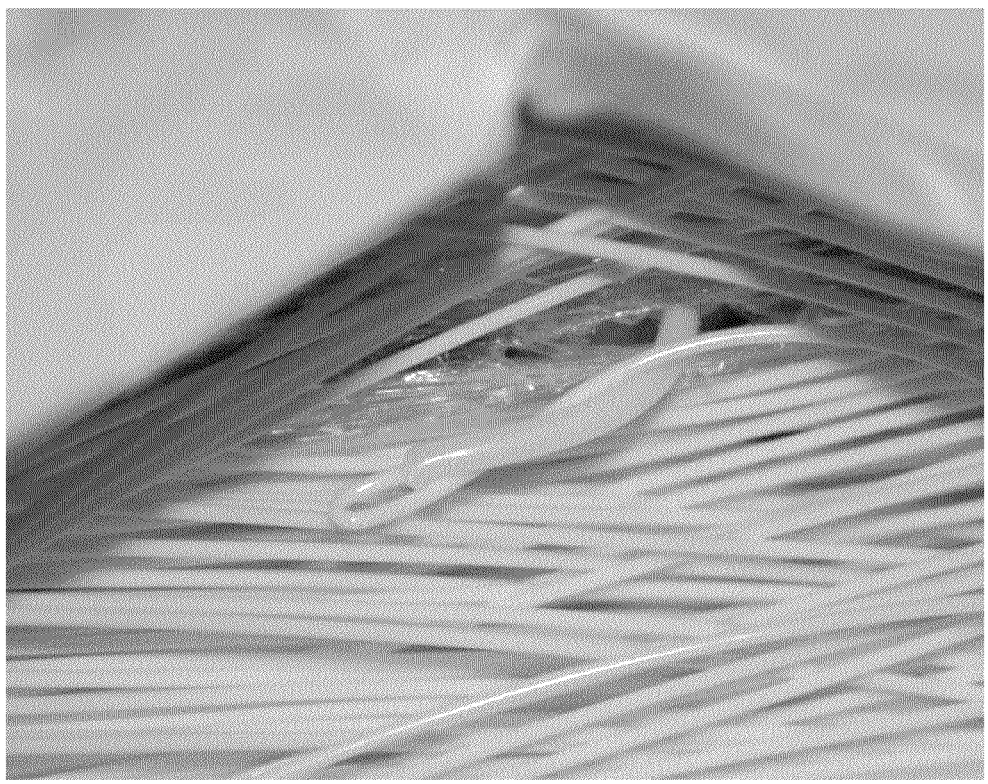

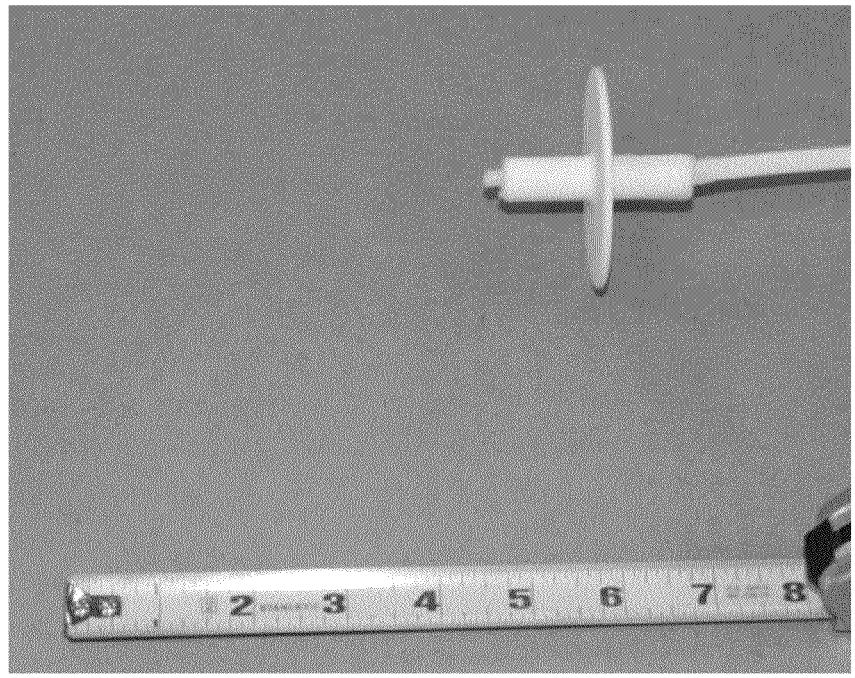
FIG. 18A
FIG. 18B
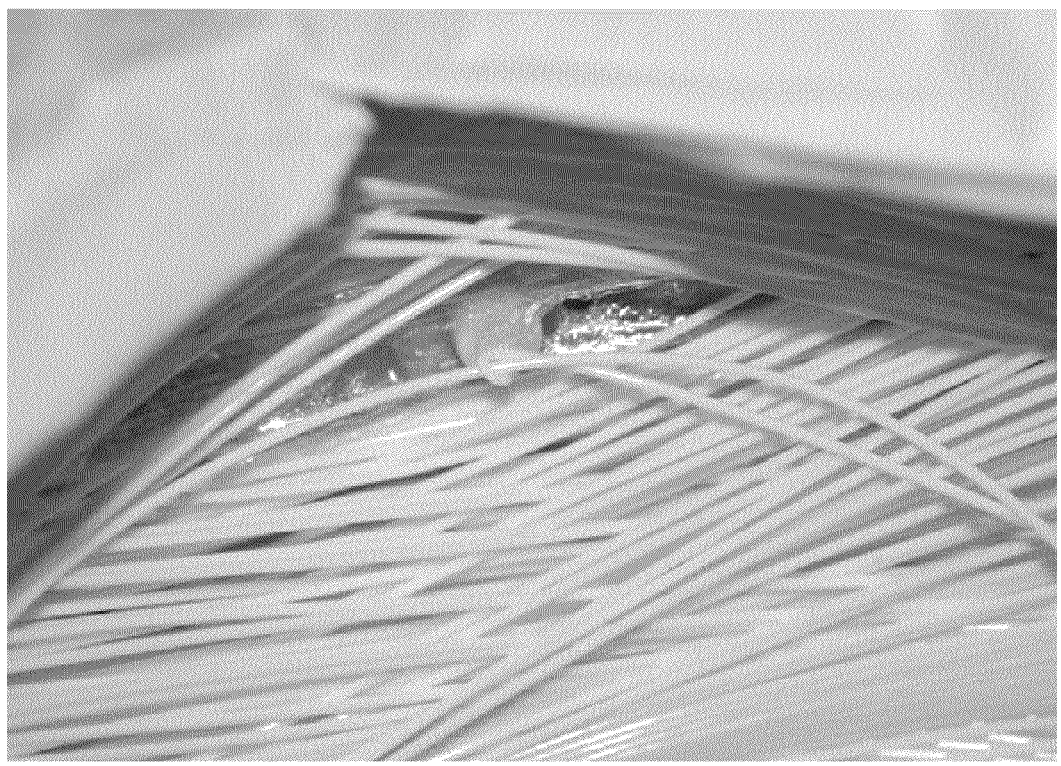

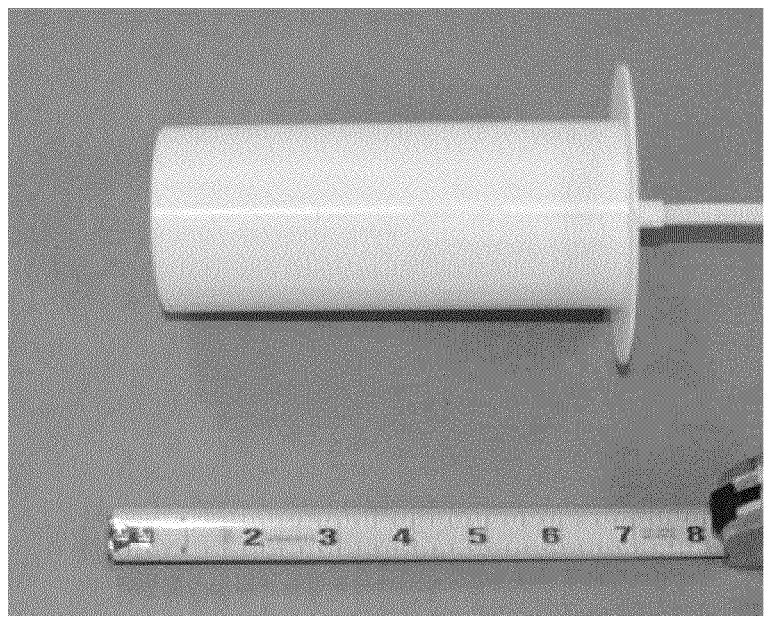
FIG. 19C
FIG. 19D
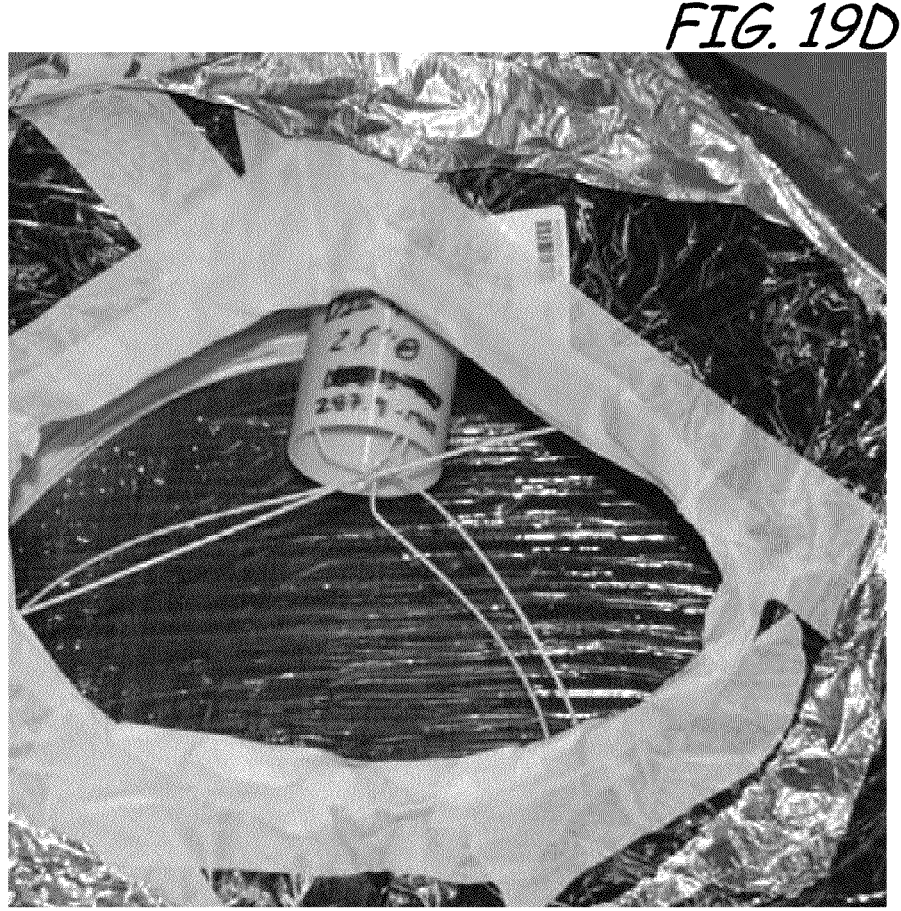

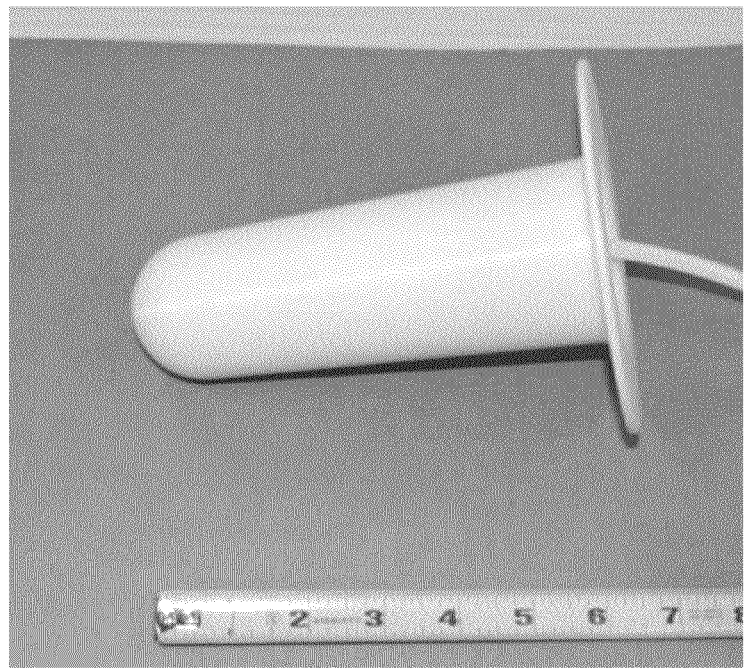
FIG. 20A
FIG. 20B
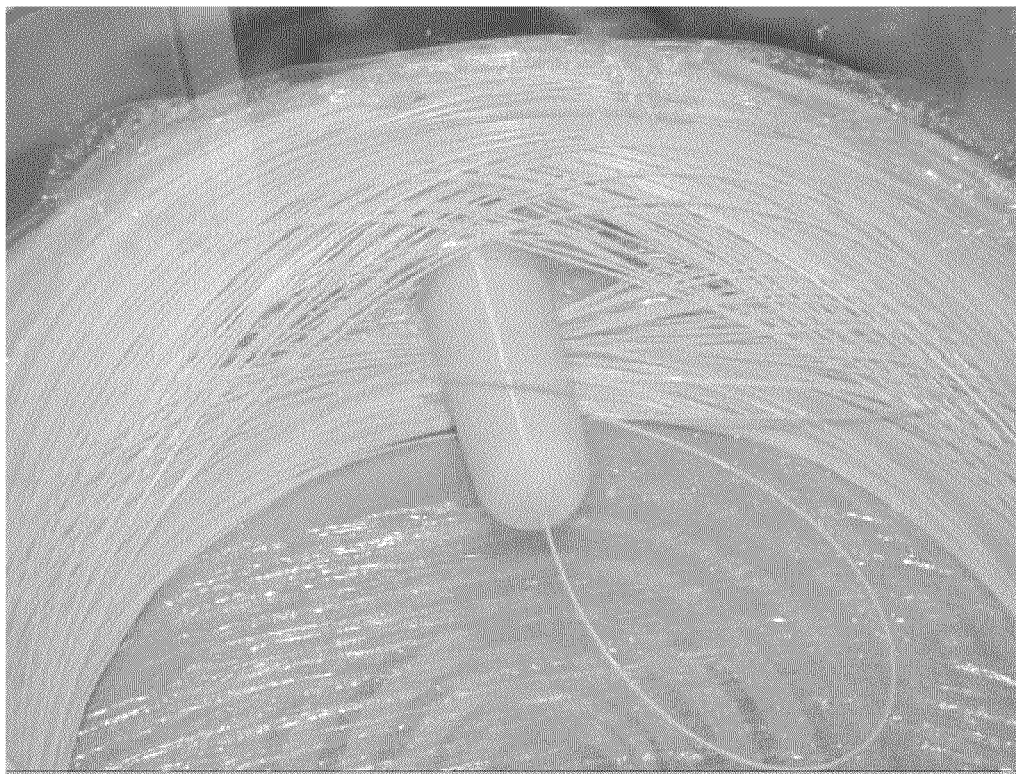

FIG. 21A
FIG. 21B
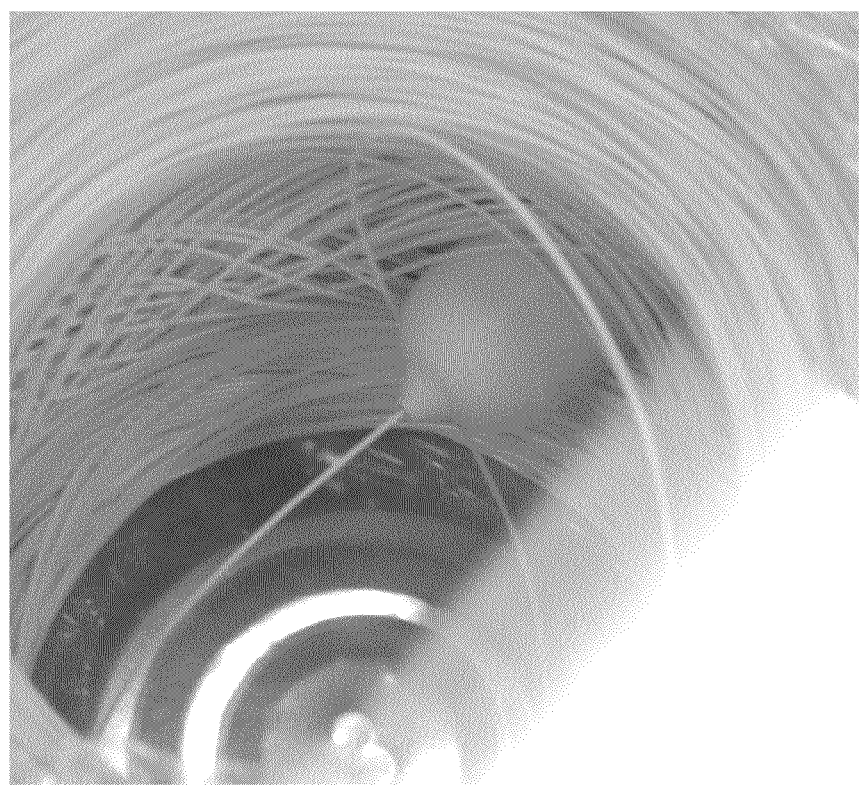

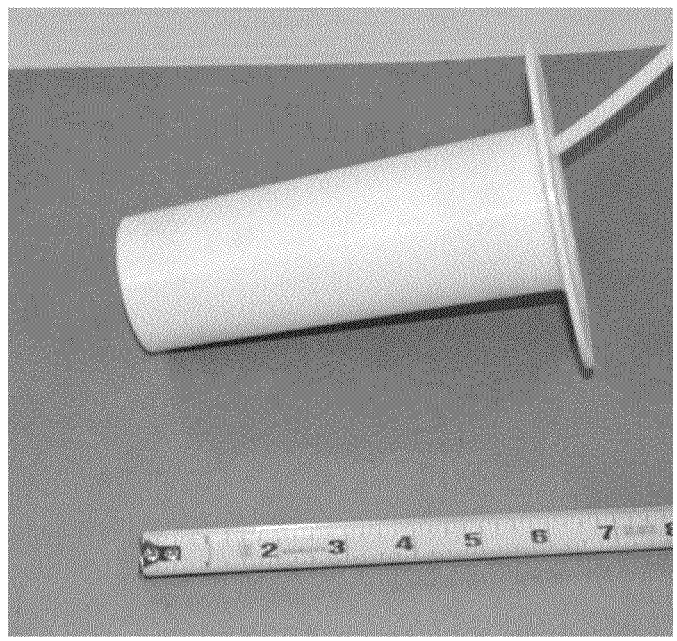
FIG. 22A
FIG. 22B
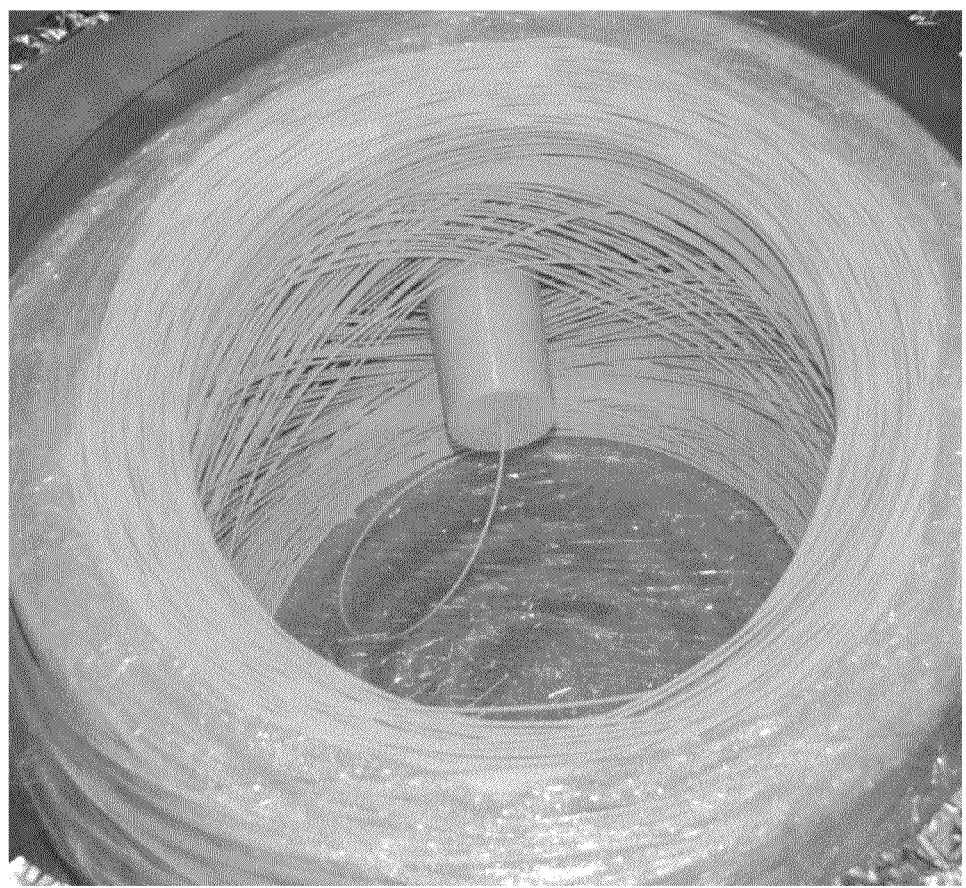

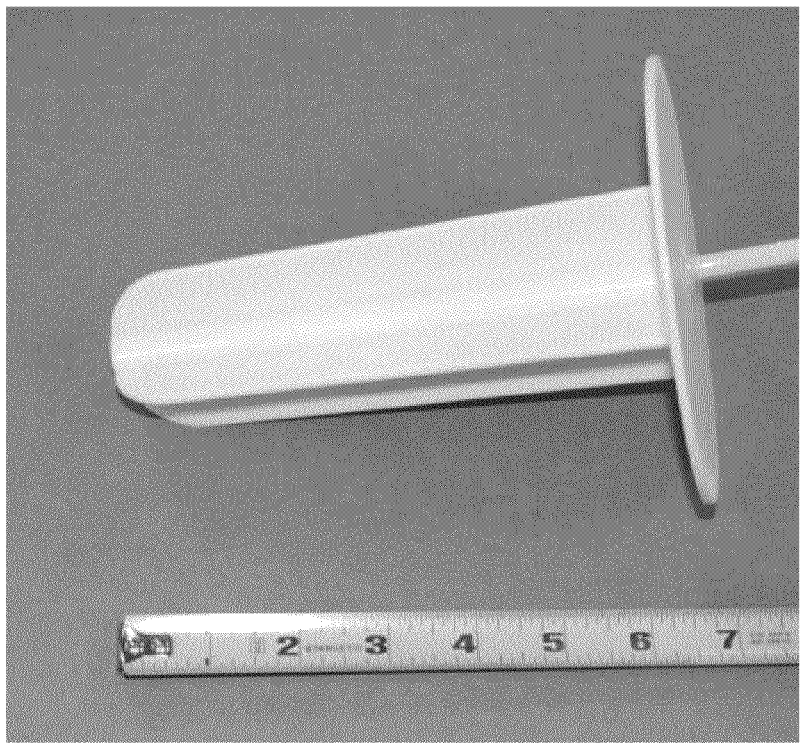
FIG. 24A
FIG. 24B

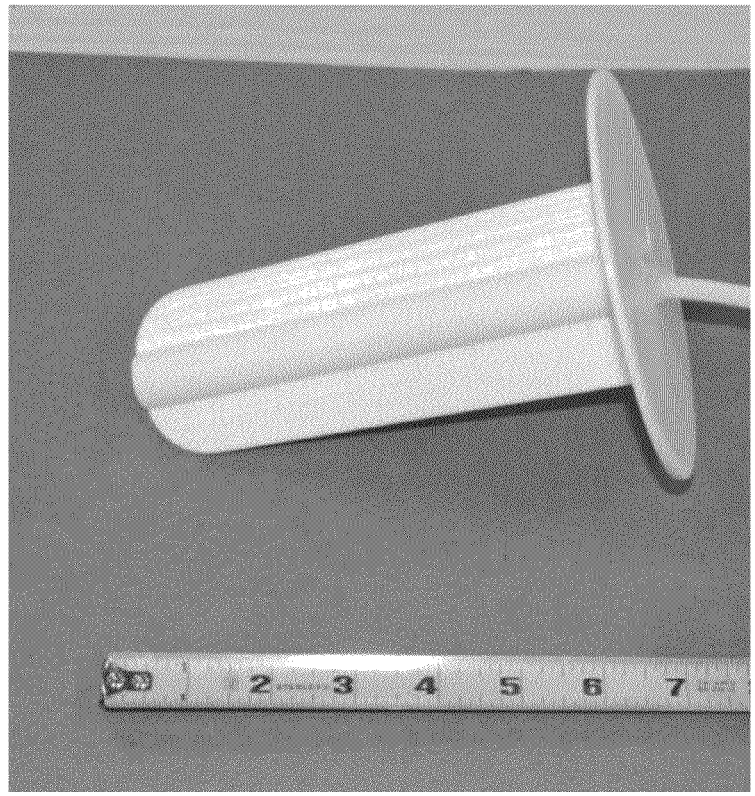
FIG. 25A
FIG. 25B
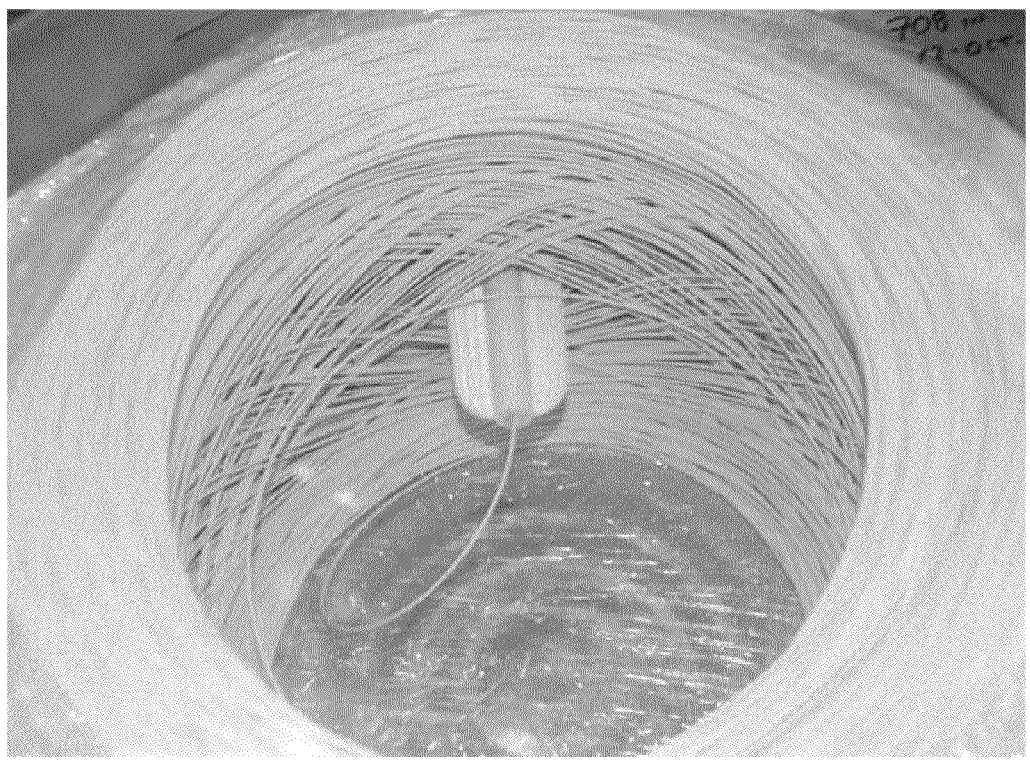

CONSUMABLE ASSEMBLY WITH PAYOUT TUBE FOR ADDITIVE MANUFACTURING SYSTEM

BACKGROUND

The present disclosure relates to additive manufacturing systems for building three-dimensional (3D) parts with layer-based, additive manufacturing techniques. In particular, the present disclosure relates to consumable assemblies for supplying consumable part and support materials to additive manufacturing systems.

Additive manufacturing systems are used to print or otherwise build 3D parts from digital representations of the 3D parts (e.g., AMF and STL format files) using one or more additive manufacturing techniques. Examples of commercially available additive manufacturing techniques include extrusion-based techniques, jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to print the given layer.

For example, in an extrusion-based additive manufacturing system, a 3D part may be printed from a digital representation of the 3D part in a layer-by-layer manner by extruding a flowable part material. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited from a second nozzle pursuant to the generated geometry during the printing process. The support material adheres to the part material during fabrication, and is removable from the completed 3D part when the printing process is complete.

SUMMARY

An aspect of the present disclosure is directed to a payout tube for enabling payout of a consumable filament from a consumable assembly that is configured for use with an additive manufacturing system. The payout tube includes a tip end having an inlet opening, a base end having an outlet opening, and a tube body having an average effective outer diameter that is substantially greater than an effective inner diameter of the inlet opening.

Another aspect of the present disclosure is directed to a consumable assembly for use with an additive manufacturing system. The consumable assembly includes a coil of a consumable filament retained in a figure-8 configuration, and having a payout hole extending from an inner layer of the coil to an outer layer of the coil, where the consumable filament has an average cross-sectional area ranging from about 0.5 square millimeters to about 11.3 square millimeters. The consumable assembly also includes a payout tube that has a tip end having an inlet opening, a base end having an outlet opening, and a tube body, where the tube body has an average effective outer diameter that is substantially greater than an effective inner diameter of the inlet opening.

Unless otherwise expressly indicated, the terms "effective inner diameter" and "average effective outer diameter" are used herein as defined below.

BRIEF DESCRIPTION OF THE DRAWINGS

FIG. 2 is a top, front perspective view of one of the consumable assemblies.

FIG. 3 is a top perspective view of a coil, payout tube, and guide tube of the consumable assembly.

FIG. 5C is a sectional view of the payout tube in use with a guide tube, taken along Section 5C-5C in FIG. 5B.

FIG. 5D is an expanded sectional view of a tip end of the payout tube and the guide tube.

FIG. 6A is a bottom, front perspective view of a first alternative payout tube of the present disclosure, which includes a capture tip, in use with a guide tube.

FIG. 6B is an exploded bottom, front perspective view of the first alternative payout tube in use with the guide tube.

FIG. 7D is an expanded sectional view of a tip end of the second alternative payout tube in use with a guide tube.

FIG. 7E is an alternative expanded sectional view of a tip end of the second alternative payout tube, which includes a capture tip, in use with the guide tube.

FIG. 8A is a bottom, front perspective view of a third alternative payout tube of the present disclosure, which includes sharp-sloped outer geometry.

FIG. 8B is a top perspective view of the third alternative payout tube.

FIG. 8C is a sectional view of the third alternative payout tube, taken along Section 8C-8C in FIG. 8B.

FIG. 8D is an expanded sectional view of a tip end of the third alternative payout tube in use with a guide tube.

FIG. 8E is an alternative expanded sectional view of a tip end of the third alternative payout tube, which includes a capture tip, in use with the guide tube.

FIG. 9C is a sectional view of the fourth alternative payout tube, taken along Section 9C-9C in FIG. 9B.

FIG. 9D is a bottom, front perspective view of the fourth alternative payout tube, taken from an opposite lateral side from the view shown in FIG. 9A, and which illustrates circumscribed circles of a payout tube body.

FIG. 10E is a sectional view of the fifth alternative payout tube, taken along Section 10E-10E in FIG. 10C.

FIG. 10F is a bottom, front perspective view of the fifth alternative payout tube, taken from an opposite lateral side from the view shown in FIG. 10A, and which illustrates circumscribed circles of a payout tube body.

FIG. 13A is a photograph of a tested payout tube of Comparative Example A.

FIGS. 13B and 13C are photographs of payout test results for the payout tube of Comparative Example A.

FIG. 14A is a photograph of a tested payout tube of Comparative Example B.

FIG. 14B is a photograph of payout test results for the payout tube of Comparative Example B.

FIG. 16A is a photograph of a tested payout tube of Comparative Example C.

FIG. 16B is a photograph of payout test results for the payout tube of Comparative Example C.

FIG. 17A is a photograph of a tested payout tube of Comparative Example D.

FIG. 17B is a photograph of payout test results for the payout tube of Comparative Example D.

FIG. 18A is a photograph of a tested payout tube of Comparative Example E.

FIG. 18B is a photograph of payout test results for the payout tube of Comparative Example E.

FIG. 19C is a photograph of the tested payout tube of Comparative Example F.

FIG. 19D is a photograph of payout test results for the payout tube of Comparative Example F.

FIG. 20A is a photograph of the tested payout tube of Example 1 of the present disclosure.

FIG. 20B is a photograph of payout test results for the payout tube of Example 1.

FIGS. 21A and 21B are photographs of payout test results for a tested payout tube of Example 2 of the present disclosure.

FIG. 22A is a photograph of the tested payout tube of Example 3 of the present disclosure.

FIG. 22B is a photograph of payout test results for the payout tube of Example 3.

FIG. 24A is a photograph of the tested payout tube of Example 5 of the present disclosure.

FIG. 24B is a photograph of payout test results for the payout tube of Example 5.

FIG. 25A is a photograph of the tested payout tube of Example 6 of the present disclosure.

FIG. 25B is a photograph of payout test results for the payout tube of Example 6.

DETAILED DESCRIPTION

The present disclosure is directed to a consumable assembly having a payout tube for use in an additive manufacturing system, such as an extrusion-based additive manufacturing system. The consumable assembly is an easily loadable, removable, and replaceable container device configured to retain a coil of part or support material consumable filament in a figure-8 configuration. The payout tube enables payout of the consumable filament from the consumable assembly without having the consumable filament become entangled (e.g., knotting up or kinking). As discussed below, this allows successive segments of the consumable filament to be fed from the consumable assembly to the additive manufacturing system without interruption. Additionally, in comparison to spooled filaments, which are limited in size due to excessive pulling forces that otherwise occur with large spools (which could break the filaments), the use of a coil of the consumable filament (in a figure-8 configuration) also effectively allows the consumable assembly to be any desired size (e.g., large coils for large printing runs).

Figure 1:
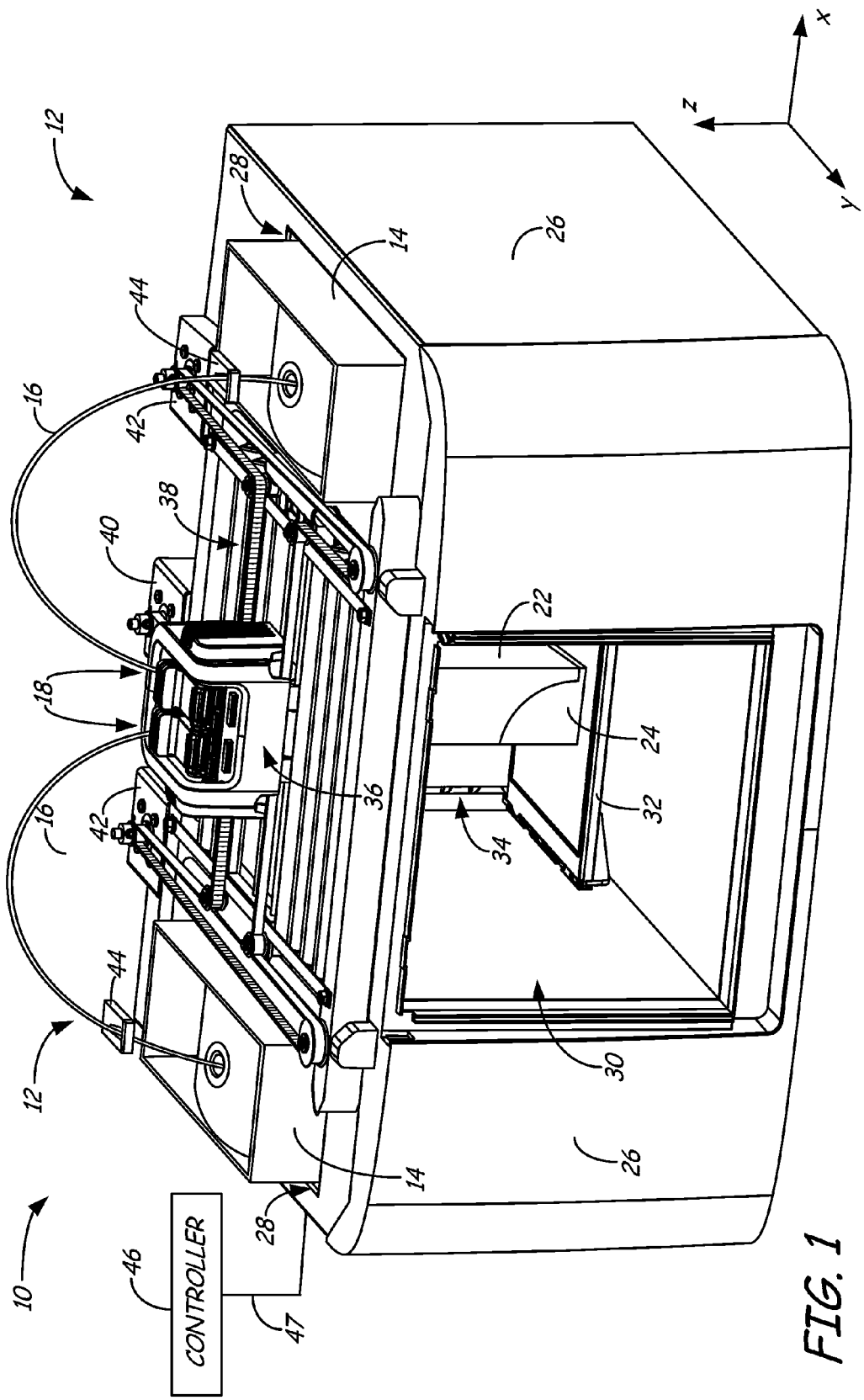
FIG. 1 is a top, front perspective view of an additive manufacturing system in use with consumable assemblies of the present disclosure.

FIG. 1 shows system 10 in use with two consumable assemblies 12 of the present disclosure, where each consumable assembly 12 is an easily loadable, removable, and replaceable container device that retains a coil of consumable filament for printing with system 10. Typically, one of the consumable assemblies 12 contains a coil of part material filament ("part material consumable assembly"), and the other consumable assembly 12 contains a coil of support material filament ("support material consumable assembly"). However, both consumable assemblies 12 may be identical in structure.

In the shown embodiment, each consumable assembly 12 includes container portion 14, guide tube 16, and print head 18, where container portion 14 retains a coil of a consumable filament and a payout tube. Guide tube 16 interconnects container portion 14 and print head 18 to supply successive segments of the consumable filament from container portion 14 to print head 18. In this embodiment, guide tube 16 and print head 18 are subcomponents of consumable assembly 12, and may be interchanged to and from system 10 with each consumable assembly 12. As discussed below, in alternative embodiments, guide tube 16 and/or print head 18 may be components of system 10, rather than subcomponents of consumable assemblies 12.

System 10 is an additive manufacturing system for printing 3D parts or models and corresponding support structures (e.g., 3D part 22 and support structure 24) from the part and support material filaments, respectively, of consumable assemblies 12, using a layer-based, additive manufacturing technique. Suitable additive manufacturing systems for system 10 include extrusion-based systems developed by Stratasys, Inc., Eden Prairie, Minn. under the trademarks "FDM" and "FUSED DEPOSITION MODELING". As shown, system 10 includes system casing 26, two bays 28, build chamber 30, platen 32, platen gantry 34, head carriage 36, head gantry 38, z-axis motor 40, and a pair of x-y motors 42.

System casing 26 is a structural component of system 10 and may include multiple structural sub-components such as support frames, housing walls, and the like. In the shown embodiment, system casing 26 defines the dimensions of bays 28, and of build chamber 30. Bays 28 are container bays configured to respectively receive container portions 14 of consumable assemblies 12. Typically, each of bays 28 may be intended to receive either a part material consumable assembly 12 or a support material consumable assembly 12.

In an alternative embodiment, bays 28 may be omitted to reduce the overall footprint of system 10. In this embodiment, container portions 14 may stand adjacent to system casing 26, while providing sufficient ranges of movement for guide tubes 16 and print heads 18. Bays 28, however, provide convenient locations for loading spool assemblies 12.

Build chamber 30 is an enclosed environment that contains platen 32 for printing 3D part 22 and support structure 24. Build chamber 30 may be heated (e.g., with circulating heated air) to reduce the rate at which the part and support materials solidify after being extruded and deposited (e.g., to reduce distortions and curling). In alternative embodiments, build chamber 30 may be omitted and/or replaced with different types of build environments. For example, 3D part 22 and support structure 24 may be built in a build environment that is open to ambient conditions or may be enclosed with alternative structures (e.g., flexible curtains).

Platen 32 is a platform on which 3D part 22 and support structure 24 are printed in a layer-by-layer manner, and is supported by platen gantry 34. In some embodiments, platen 32 may also include a flexible polymeric film or liner on which 3D part 22 and support structure 24 are printed. Platen gantry 34 is a gantry assembly configured to move platen 32 along (or substantially along) the vertical z-axis and is powered by z-axis motor 40.

Head carriage 36 is a unit configured to receive one or more removable print heads, such as print heads 18, and is supported by head gantry 38. Examples of suitable devices for head carriage 36, and techniques for retaining print heads 18 in head carriage 36, include those disclosed in Swanson et al., U.S. patent application Ser. No. 12/976,111; Swanson, U.S. Patent Application Publication No. 2010/0283172; and Swanson, International Publication No. WO2009/088995.

Head gantry 38 is a belt-driven gantry assembly configured to move head carriage 36 (and the retained print heads 18) in (or substantially in) a horizontal x-y plane above build chamber 30, and is powered by x-y motors 42. Examples of suitable gantry assemblies for head gantry 38 include those disclosed in Comb et al., U.S. patent Ser. No. 13/242,561.

As further shown in FIG. 1, system 10 may also include a pair of sensor assemblies 44, which, in the shown embodiment, are located adjacent to bays 28. Sensor assemblies 44 are configured to receive and retain guide tubes 16, while also providing sufficient ranges of movement for guide tubes 16 and print heads 18. Sensor assemblies 44 are also configured to read encoded markings from successive segments of the consumable filaments moving through guide tubes 16. Examples of suitable devices for sensor assemblies 44 include those disclosed in Batchelder et al., U.S. Patent Application Publication Nos. 2011/0117268, 2011/0121476, and 2011/0233804.

System 10 also includes controller 46, which is one or more processor-based controllers that may communicate over communication line 47 with print heads 18, build chamber 30 (e.g., with a heating unit for build chamber 30), head carriage 36, motors 40 and 42, sensor assemblies 44, and various sensors, calibration devices, display devices, and/or user input devices. In some embodiments, controller 46 may also communicate with one or more of bays 28, platen 32, platen gantry 34, head gantry 38, and any other suitable component of system 10.

While illustrated as a single signal line, communication line 47 may include one or more electrical, optical, and/or wireless signal lines, allowing controller 46 to communicate with various components of system 10. Furthermore, while illustrated outside of system 10, controller 46 and communication line 47 may be internal components to system 10.

During operation, controller 46 directs z-axis motor 40 and platen gantry 34 to move platen 32 to a predetermined height within build chamber 30. Controller 46 then directs motors 42 and head gantry 38 to move head carriage 36 (and the retained print heads 18) around in the horizontal x-y plane above build chamber 30. Controller 46 may also direct print heads 18 to selectively draw successive segments of the consumable filaments from container portions 14 and through guide tubes 16, respectively.

Each print head 18 thermally melts the successive segments of the received consumable filament such that it becomes a molten material, thereby allowing the molten material to be extruded and deposited onto platen 32 for printing 3D part 22 and support structure 24 in a layer-by-layer manner. After the print operation is complete, the resulting 3D part 32 and support structure 24 may be removed from build chamber 30, and support structure 24 may be removed from 3D part 22. 3D part 22 may then undergo one or more additional post-processing steps.

As discussed above, consumable assemblies 12 are removable and replaceable container devices. As shown in FIG. 2, consumable assembly 12 also includes box 48, liner 50, payout tube 52, and coil 54 of a consumable filament for use in system 10 (e.g., a part or support material filament). In the shown example, box 48 is a rigid or semi-rigid container for consumable assembly 14, and may include a variety of indicia and graphics for identifying the material type for coil 54. Box 48 may also include a compartment to retain guide tube 16 and print head 18 during transportation and storage.

Liner 50 encases payout tube 52 and coil 54 within box 48, and may be one or more polymeric bags, wrappings (e.g., shrink wrap liner), metallic foil casings, and the like, which desirably prevent or substantially prevent ambient conditions from reaching coil 54. For example, liner 50 may be a moisture-impermeable liner or sheath to provide a moisture barrier, a gas-impermeable liner or sheath to provide a gas barrier, a particulate-impermeable liner or sheath to provide a dust barrier, and the like. Liner 50 may also be opaque to reduce light exposure (e.g., ultraviolet light exposure), to reduce the risk of degrading the consumable filament of coil 54 over extended periods of storage.

In the case of moisture-sensitive materials, consumable filament of coil 54 is desirably provided to print head 18 in a dry state (e.g., less than 300 parts-per-million by weight of water) to prevent moisture from negatively affecting the extrusion process. As such, liner 50 may provide a moisture barrier for the consumable filament during transportation, storage, and use in system 10.

In an alternative embodiment, liner 50 may be omitted and box 48 may provide the barrier against ambient conditions (e.g., moisture resistance). In this embodiment, guide tube 16 may extend through a sealed opening in box 48, adjacent to payout tube 52, to allow print head 18 to be loaded to head carriage 36 of system 10. In another alternative embodiment, box 48 may be omitted, and payout tube 52 and coil 54 may be retained solely within liner 54. In this embodiment, the consumable assembly within liner 54 may be directly loaded to bay 28 or otherwise made available for use with system 10.

Payout tube 52 is a rigid component that extends through coil 54 and is configured to receive guide tube 16, as shown. In particular, guide tube 16 desirably extends through liner 50 in a sealed arrangement to maintain the barrier from ambient conditions. For example, guide tube 16 may be secured to an opening through liner 50 with a sealing adhesive.

As discussed below, payout tube 52 enables the consumable filament of coil 54 to unwind from coil 54 without becoming entangled. As can be appreciated, if the consumable filament of coil 54 becomes entangled during payout, the resulting knot or kink will be caught in guide tube 16 or print head 18 (or fail to even enter guide tube 16), preventing the filament from reaching a liquefier of print head 18. This would disrupt the printing operation in system 10, which relies on accurate timings of the deposited part and support materials, thereby impeding the printing operation.

Prior to use in system 10, the user may open box 48 and remove guide tube 16 and print head 18, and engage guide tube 16 through sensor assembly 44. The user may then insert print head 18 into head carriage 36 as discussed in Swanson et al., U.S. patent application Ser. No. 12/976,111. As discussed in Swanson et al., U.S. patent application Ser. No. 12/976,111; Swanson, U.S. Patent Application Publication No. 2010/0283172; and Swanson, International Publication No. WO2009/088995, the consumable filament in the consumable assembly 12 may be pre-fed through guide tube 16, and into print head 18.

In this embodiment, print head 18 includes a filament drive mechanism for drawing successive segments of the consumable filament from container portion 14 and through guide tube 16. As such, once each consumable assembly 12 is loaded, system 10 may begin to use the consumable filaments during one or more pre-printing operations (e.g., calibration routines) or during print operations without requiring the user to perform any additional loading tasks.

As shown in FIG. 3, coil 54 includes filament 56 retained in a figure-8 configuration, where filament is a consumable filament for use in system 10 (e.g., a part or support material filament). The figure-8 configuration of coil 54 is well known for materials such as wire, rope, communication cables, and the like, and is described in references such as U.S. Pat. Nos. 2,767,938 and 4,406,419, and the references cited therein. The figure-8 configuration of coil 54 has an inner layer 58 and an outer layer 60, and provides a payout hole 62 that extends through coil 54 between inner layer 58 and outer layer 60.

Payout tube 52 extends through payout hole 62, and includes base end 64 having outlet opening 66 and collar 68. Outlet opening 66 is an opening through which guide tube 16 extends to relay successive segments of filament 56 to print head 18. Collar 68 extends around outlet opening 66 and provides a suitable mechanism to holding payout tube 52 against outer layer 60 of coil 54, such as with liner 50 (shown in FIG. 2).

Figure 4:
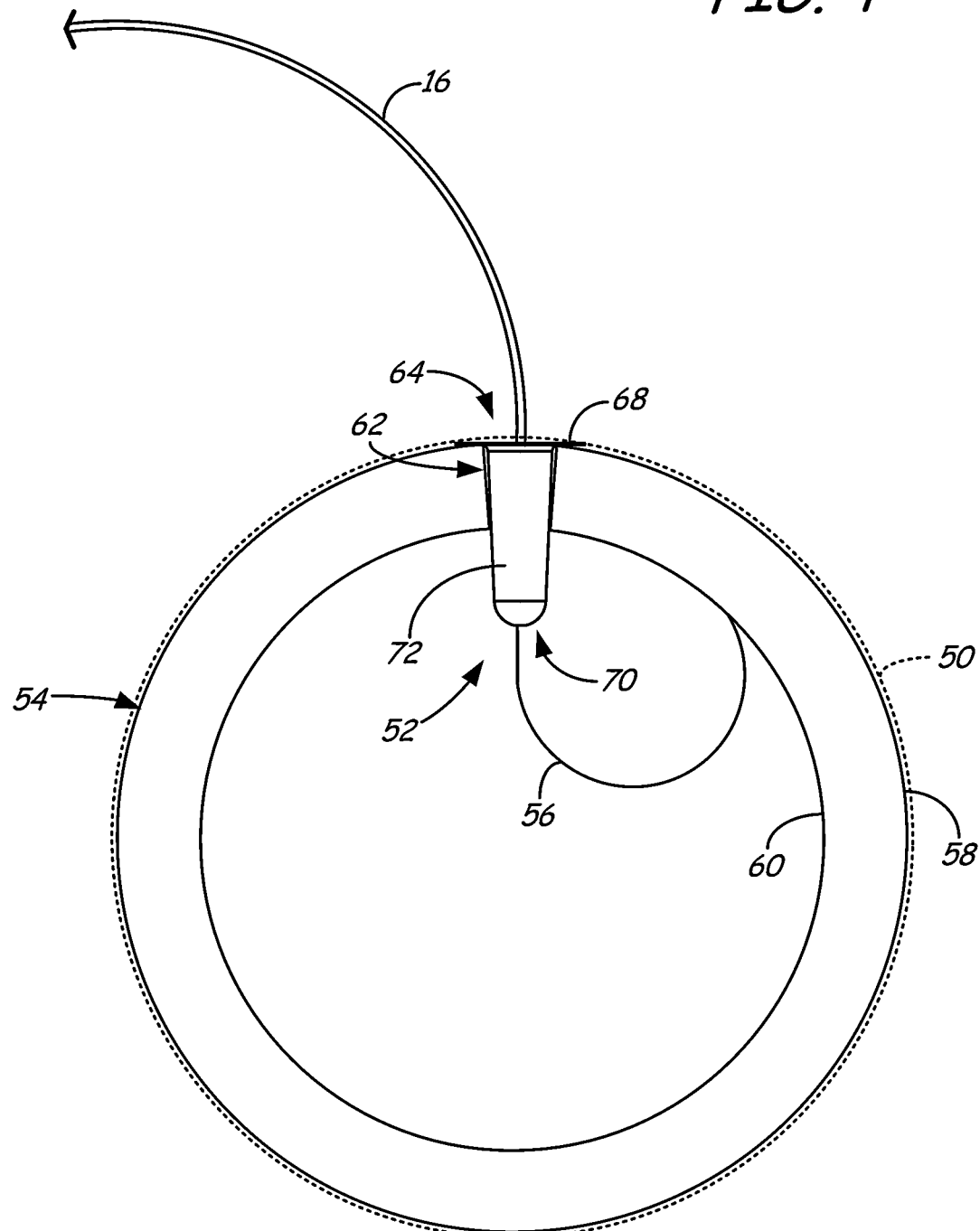
FIG. 4 is a side illustration of the coil, payout tube, guide tube, and a liner of the consumable assembly.

This is further illustrated in FIG. 4, in which a segment of filament 56 extends into tip end 70 of payout tube 52. Payout tube 52 has a body 72 between base end 64 and tip end 70 that extends through payout opening 62, with tip end 70 extending inward toward the radial center of coil 54 from inner layer 60. During assembly of consumable assembly 12, filament 56 may be wound in the known figure-8 configuration, which creates payout hole 62. Guide tube 16 may secured within payout tube 52, and payout tube 52 may be inserted through payout hole 62 until collar 68 rests against outer layer 58 of coil 54.

The leading end of filament 56 may inserted into an inlet opening of payout tube 52 at tip end 70 (not shown in FIG. 4), and fed through guide tube 16 to print head 18, as discussed above. Payout tube 52 and coil 54 may then be sealed in liner 50 and loaded into box 48 for transportation, storage, and use with system 10.

As mentioned above, the figure-8 configuration of coil 54 is well known for use with strand materials such as wire, rope, communication cables, and the like. Such strand materials are also typically fed through payout tubes to prevent the strands from becoming entangled. Current commercially available payout tubes typically have inlet diameters that are large compared to the strands they receive. This allows the current payout tubes to accommodate the payout of such strands, for example, by allowing looped twists in the strands to pass through the payout tube.

It turns out, however, that the current payout tubes repeatedly cause consumable filaments, such as filament 56, to become entangled at the inlet ends of the payout tubes. As mentioned above, this can disrupt printing operations in additive manufacturing systems (e.g., system 10). Instead, as discussed below, the payout tubes of the present disclosure (e.g., payout tube 52) have geometries that are different from those of the current payout tubes, and prevent payout entanglement for the consumable filaments.

Figure 5A:
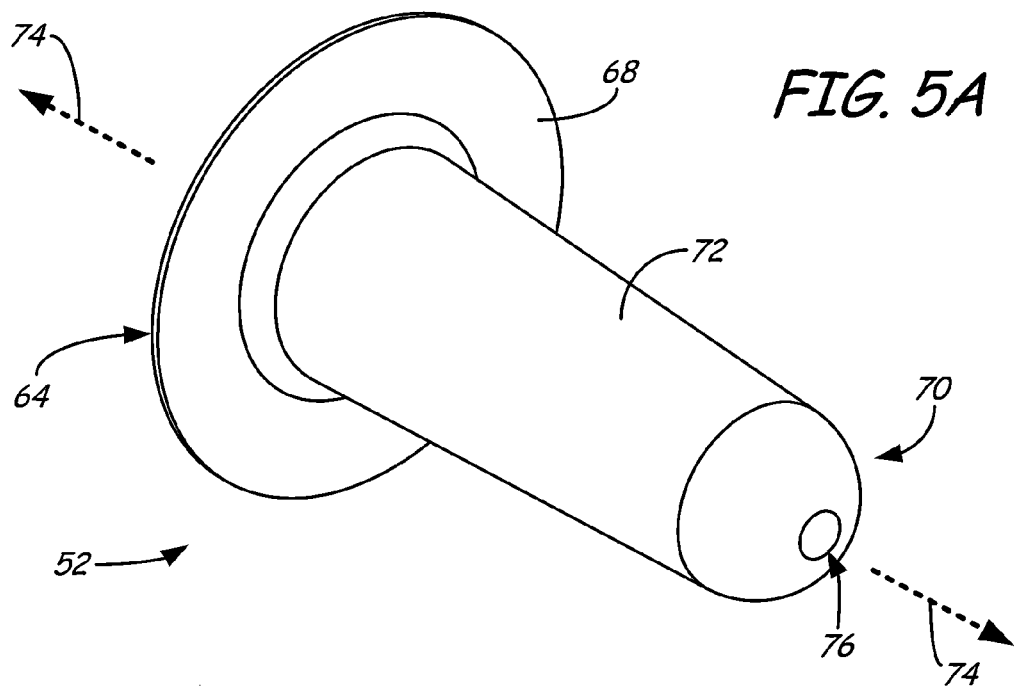
FIG. 5A is a bottom, front perspective view of the payout tube.

FIGS. 5A-5D further illustrate payout tube 52. As shown in FIG. 5A, body 72 of payout tube 52 extends from collar 68 along longitudinal axis 74, between base end 64 and tip end 70. At tip end 70, payout tube 52 also includes inlet opening 76, which has an inner diameter that substantially less than the average outer diameter of body 72. As discussed below, this combination of a small diameter inner opening 76 and a substantially larger average outer diameter for body 72 prevents or reduces payout entanglement for consumable filaments such as filament 56.

Figure 5B:
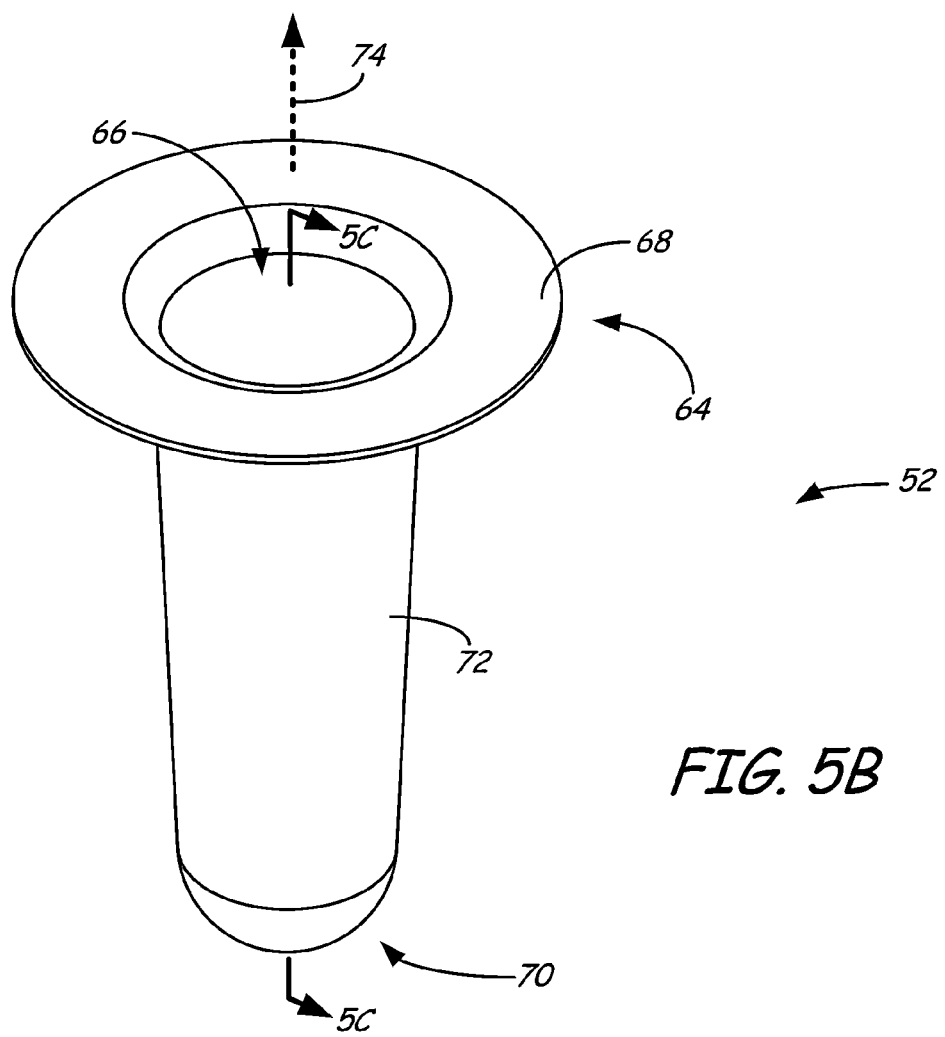
FIG. 5B is a top perspective view of the payout tube.

As shown in FIGS. 5A and 5B, inlet opening 76 is also smaller than outlet opening 66, where the larger inner diameter of outlet opening 66 allows guide tube 16 to freely move. In alternative embodiments, outlet opening 66 may be any suitable size that is at least as great as inlet opening 66. As shown in FIG. 5C, body 72 has an inner diameter that defines interior channel 78, where, in the shown embodiment, interior channel 78 converges to narrowed gap 80 at tip end 70. Narrowed gap 80 extends between interior channel 78 and inlet opening 76, and provides a suitable location for receiving a tip or leading end of guide tube 16 (referred to as leading end 82).

Body 72 has a length 84 along longitudinal axis 74, between base end 64 and tip end 70. Suitable distances for length 84 range from about 130 millimeters (about 5 inches) to about 250 millimeters (about 10 inches). Length 84 is also desirably proportional to the thickness of coil 54 between outer layer 58 and inner layer 60, such that base end 64 and tip end 70 are located outside the opposing ends of payout opening 62 in coil 54.

Body 72 also has an average outer diameter 86 that is perpendicular to longitudinal axis 74, and that is taken as an average of the outer diameters along longitudinal axis 74 between base end 64 (not including collar 68) and tip end 70. In other words, average outer diameter 86 may be determined by (1) determining the diameters of the outer cross-sectional geometries of the payout tube body at multiple points along longitudinal axis 74 (not including collar 68), and (2) averaging the determined diameters. Examples of suitable dimensions for average outer diameter 86 range from about 38 millimeters (about 1.5 inches) to about 130 millimeters (about 5 inches). As can be appreciated, outer average diameter 86 is substantially greater than inlet opening 76.

In the shown example, body 72 is conical with round outer cross-sectional geometries, and is wider at base end 64 than at tip end 70. In an alternative embodiment, body 72 may be cylindrical (i.e., constant diameter). In these embodiments, the outer cross-sectional geometries of body 72 may be described in terms of diameters (e.g., average outer diameter 86).

In other embodiments, however, the payout tube body may not necessarily have a round cross-sectional geometry (see e.g., payout tube 452 in FIGS. 9A-9F, and payout tube 552 in FIGS. 10A-10H). In these embodiments, "diameter" is not a suitable term to directly describe their outer cross-sectional dimensions. Instead, as discussed further below, the outer cross-sectional dimensions may be based on an average diameter of circumscribed circles of the outer geometry.

Accordingly, as used herein, the "average effective outer diameter" of a payout tube body is the average diameter of the circumscribed circles of the outer cross-sectional geometries of the payout tube body, taken along the longitudinal length of the payout tube body. In other words, the "average effective outer diameter" may be determined by (1) virtually creating circumscribed circles of the outer cross-sectional geometries of the payout tube body at multiple points along the longitudinal axis of the payout tube body (not including any collars, such as collar 68), (2) determining the diameters of the circumscribed circles, and (3) averaging the determined diameters. As can be appreciated, in embodiments in which the payout tube body is conical, cylindrical, or the like, the "average effective outer diameter" of the payout tube body is the same as its average outer diameter (e.g., average outer diameter 86).

Guide tube 16 may be secured to payout tube 52 by inserting leading end 82 through outlet opening 66, interior channel 78, narrowed gap 80, inlet opening 76. This positions leading end 82 outside of inlet opening 76. E-clip 92 may then be inserted around leading end 82, and leading end 82 may be withdrawn back into inlet opening 76, where e-clip 92 is prevented from entering narrowed gap 80.

As shown in FIG. 5D, leading end 82 may then be secured within inlet opening 76, such with an adhesive (e.g., adhesive 94). This prevents guide tube 16 from detaching from payout tube 52, and allows filament 56 to directly enter guide tube 16 within payout tube 52. Leading end 82 and adhesive 94 are desirably flush with the exterior surface of body 72 at inlet opening 76.

As mentioned above, inlet opening 76 has an inner diameter (referred to as inner diameter 96) that is substantially less than average outer diameter 84 of body 72, and this combination is believed to reduce or prevent payout entanglement of filament 56. Additionally, in the shown embodiment, leading end 82 of guide tube 16 and adhesive 94 effectively reduce the dimensions of inner diameter 96 to the inner diameter of guide tube 16 at leading end 82 (referred to as inner diameter 98).

As discussed below, in alternative embodiments, guide tube 16 may be secured to payout tube 52 at different locations within interior region 78, such as at base end 64. In these embodiments, the effective inner diameter that filament 56 travels through would be inner diameter 96 of inlet opening 76.

In the shown example, inlet opening 76 and leading end 82 of guide tube 16 each have round cross-sectional geometries. As such, their cross-sectional dimensions may be referred by their diameters (e.g., inner diameters 96 and 98). In other embodiments, however, inlet opening 76 and/or leading end 82 of guide tube 16 may not necessarily have round cross-sectional geometries (e.g., rectangular cross-sectional geometries). In these embodiments, "diameter" is not a suitable descriptive term to directly reference their inner cross-sectional dimensions. Instead, the inner cross-sectional dimensions may be based on an average diameter of circumscribed circles of the inner cross-sectional geometries.

Accordingly, as used herein, the "effective inner diameter" of an inlet opening (e.g., of inlet opening 76 and/or the inlet opening at leading end 82 of guide tube 16) is the diameter of the circumscribed circle of the inner cross-sectional geometry of the opening. In other words, the "effective inner diameter" may be determined by (1) virtually creating a circumscribed circle of the inner cross-sectional geometry of the inlet opening, and (2) determining the diameter of the circumscribed circle. As can be appreciated, in embodiments in which the inlet opening is circular, the "effective inner diameter" of the inlet opening is the same as its inner diameter (e.g., inner diameters 96 and 98).

Examples of suitable dimensions for the effective inner diameter of inlet opening 76 (e.g., inner diameter 98) include diameters less than about 7.6 millimeters (about 0.3 inches), more desirably less than about 6.4 millimeters (about 0.25 inches), and even more desirably less than about 5.1 millimeters (about 0.2 inches). Additionally, the effective inner diameter of inlet opening 76 is also proportional to the dimensions of filament 56, which are discussed below. Suitable dimensions for the effective inner diameter of inlet opening 76 also range from about 110% to about 300% of the average outer diameter of filament 56, with particularly suitable dimensions ranging about 150% to about 275% of the average outer diameter of filament 56, and with even more particularly suitable dimensions ranging about 200% to about 250% of the average outer diameter of filament 56.

As mentioned above, the effective inner diameter (e.g., inner diameter 98) of inlet opening 76 is also substantially less than average outer diameter 84 of body 72. Average outer diameter 84 is desirably at least three times greater than the effective inner diameter of inlet opening 76. In one embodiment, average outer diameter or width 84 is also at least four times greater than the effective inner diameter of inlet opening 76, and more desirably at least five times greater.

Figure 6C:
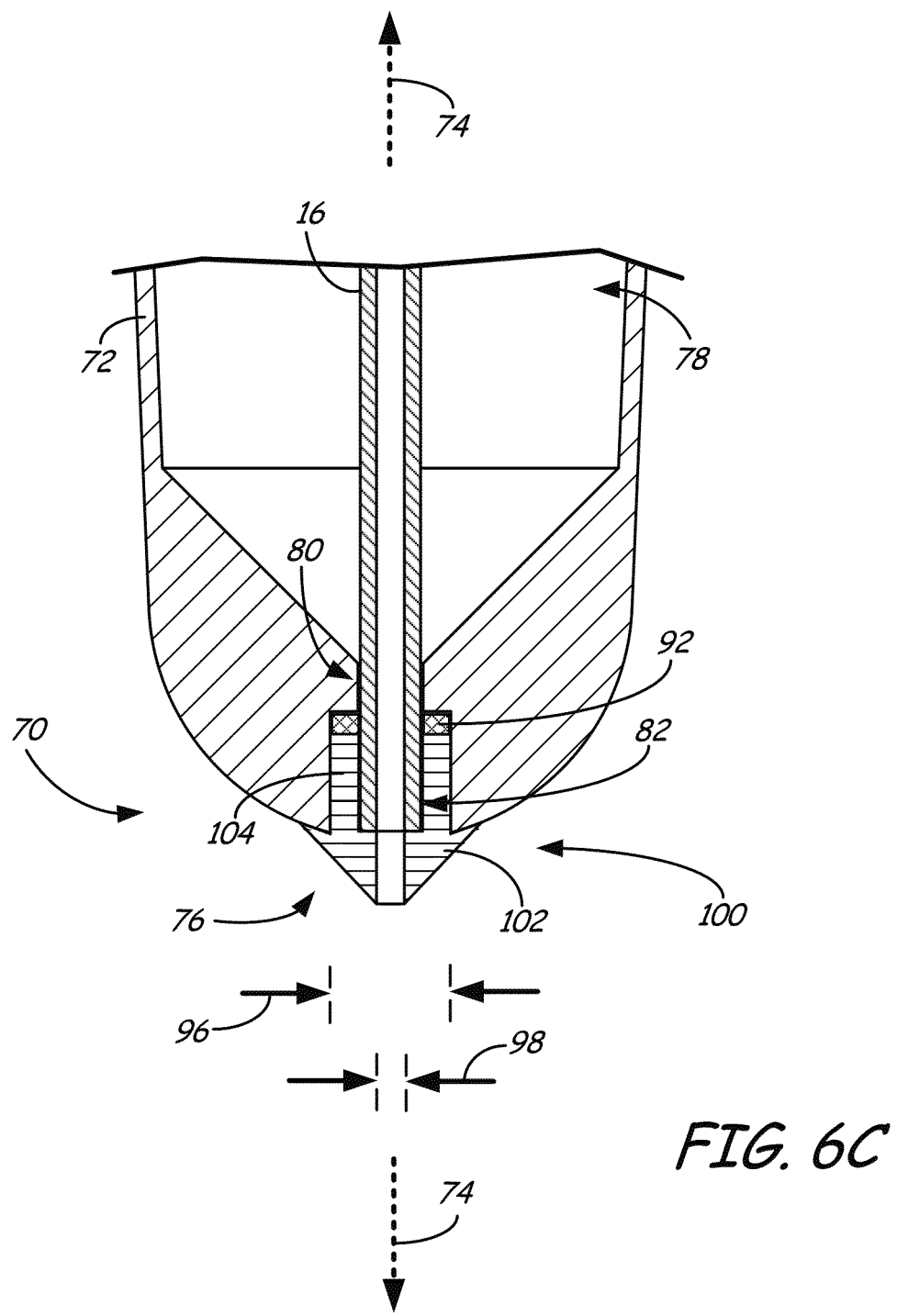
FIG. 6C is a sectional view of a tip end of the first alternative payout tube in use with the guide tube, taken along Section 6C-6C in FIG. 6A.
Figure 7A:
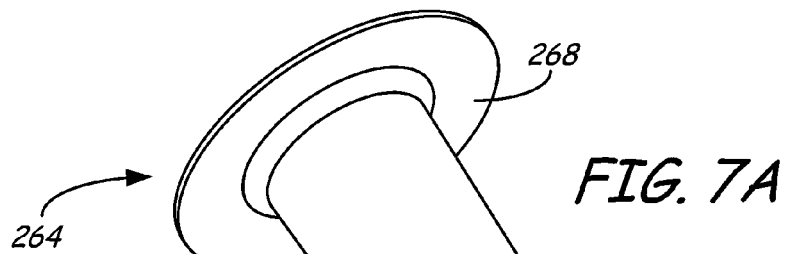
FIG. 7A is a bottom, front perspective view of a second alternative payout tube of the present disclosure, which includes a flat tip end.
Figure 7B:
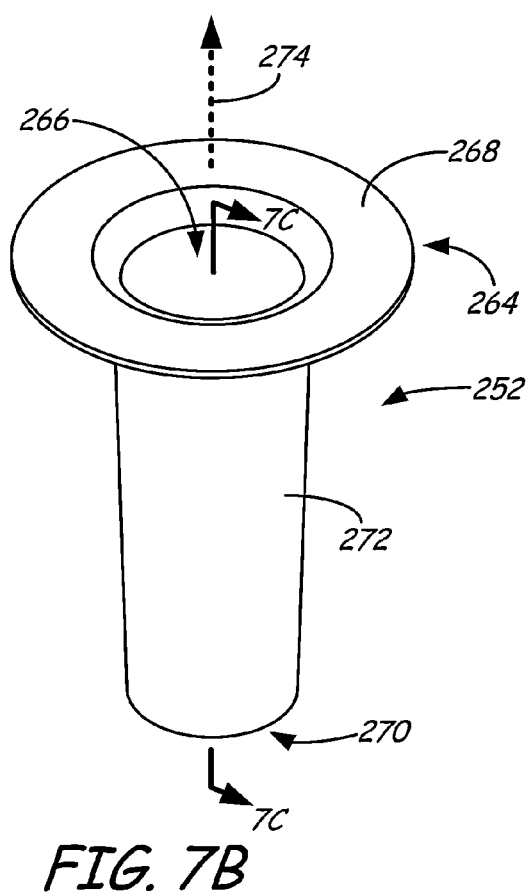
FIG. 7B is a top perspective view of the second alternative payout tube.
Figure 7C:
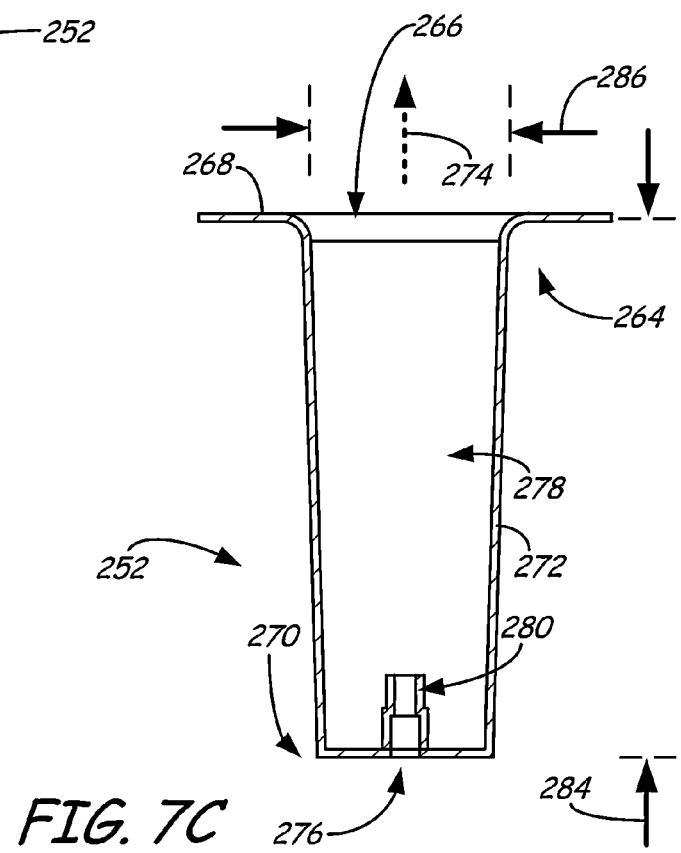
FIG. 7C is a sectional view of the second alternative payout tube, taken along Section 7C-7C in FIG. 7B.

FIGS. 6A-6C illustrate an additional feature for payout tube 52, namely capture tip 100 secured to tip end 70 at inlet opening 76. As shown in FIG. 6A, capture tip 100 includes conical portion 102, which provides a conical surface at inlet opening 76 for receiving filament 56. This eliminates surfaces that are perpendicular to the direction of movement of filament 56 as filament 56 enters payout tube 52 (i.e., surfaces that are perpendicular to longitudinal axis 74).

In some situations, even a small surface that is perpendicular to the direction of movement of filament 56 can create a shelf that catches filament 56 as it enters inlet opening 76.

Once caught on this shelf, filament 56 can pull itself to a decreasing radius until it kinks, where the kink can be large enough to prevent it from entering leading end 82 of guide tube 16. This results in a jam of filament 56, which can disrupt the printing operation in system 10. Capture tip 100 provides a convenient mechanism for reducing or eliminating this shelving effect by providing a surface that is not perpendicular to the direction of movement of filament 56.

As shown in FIG. 6B, capture tip 100 also includes base portion 104, which may be integrally formed with conical portion 102 from one or more polymeric and/or metallic materials. Capture tip 100 may be assembled to guide tube 16 and payout tube 52 using the same process discussed above. For example, leading end 82 of guide tube 16 may be inserted through payout tube 52, thereby positioning leading end 82 outside of inlet opening 76. E-clip 92 may then be inserted around leading end 82, and leading end 82 may be inserted into base portion 104 of capture tip 100. Guide tube 16 may then be withdrawn back into inlet opening 76, where e-clip 92 and capture tip 100 are prevented from entering narrowed gap 80. Base portion 102 may be secured within inlet opening 76 by frictional fit and/or snap-fit, and may optionally include an adhesive.

As shown in FIG. 6C, when assembled, e-clip 92 and capture tip 100 retain leading end 82 of guide tube 16 within inlet opening 76. In comparison to the surface formed by tip end 70 and adhesive 94 (best shown in FIG. 5D), which is substantially perpendicular to the direction of movement of filament 56, conical portion 102 of capture tip 100 provides a sloped surface that is not perpendicular to the direction of movement of filament 56, thereby reducing or eliminating the shelving effect.

Additionally, capture tip 100 precludes the need for an adhesive near inlet opening 76. It turns out that if adhesive 94 (shown in FIG. 5D) is not sufficiently flush with the exterior surface of body 72 at inlet opening 76, it may come in contact with filament 56 as filament 56 passes through inlet opening 76. This contact can potentially increase the risk of the shelving effect.

Capture tip 100 has an inner diameter that is substantially the same as the inner diameter of guide tube 16. As such, in this embodiment, the effective inner diameter of inlet opening 76 is the same as the dimensions of inner diameter 98. However, in alternative embodiments, capture tip 100 may have an inner diameter that is different (e.g., smaller) than that of leading end 82 of guide tube 16. In these embodiments, the effective inner diameter of inlet opening 76 is the same as the dimensions of the inner diameter of capture tip 100.

FIGS. 7A-10H illustrate alternative payout tubes of the present disclosure, referred to as payout tubes 252, 352, 452, and 552, where corresponding reference numbers in FIGS. 7A-10H are respectively increased by "200", "300", "400", and "500" from those of payout tube 52 and guide tube 16. Payout tubes 252, 352, 452, and 552 each have an inlet opening with an effective inner diameter that is substantially less than the average effective outer diameter of the payout tube body, which reduces or prevents payout entanglement.

As shown in FIGS. 7A-7E, payout tube 252 is similar to payout tube 52, but does not include a curved geometry at tip end 270. This embodiment is particularly suitable for use with a capture tip, such as capture tip 300 (shown in FIG. 7E), to provide a sloped surface that is not perpendicular to the direction of movement of filament 56.

As shown in FIGS. 8A-8E, payout tube 352 is also similar to payout tube 52, where the geometry of body 372 converges with a sharper slope compared to payout tubes 52 and 252. For example, the diameters of payout tubes 52 and 252 each reduce by about 20%. In comparison, the diameter of payout tube 352 reduces by about 70%.

Accordingly, in some embodiments, the average effective outer diameter reduces by less than 35%, and more desirably less than about 25%, as taken in a direction toward the tip end of the payout tube (e.g., tip end 70). Alternatively, in other embodiments, the average effective outer diameter reduces by amount ranging from about 60% to about 80%, as taken in a direction toward the tip end of the payout tube.

As shown in FIGS. 9A-9F, payout tube 452 is also similar to payout tube 52, but does not have a round outer cross-sectional geometry, as discussed above. Instead, body 472 of payout tube 452 includes central shaft 506 and four ribs 508 extending radially outward from central shaft 506 in an X-shaped pattern. As mentioned above, in this embodiment, "diameter" is not a suitable term to directly describe outer cross-sectional dimensions of body 472. Instead, the outer cross-sectional dimensions may be based on the diameters of circumscribed circles of the outer geometry, such as circumscribed circles 488 shown in FIG. 9D.

For example, the "average effective outer diameter" of body 472 (referred to as average effective outer diameter 486 may be determined by virtually creating circumscribed circles 488 along the length of body 572, determining the diameters of each of circumscribed circles 488, and averaging the determined diameters. Suitable dimensions for average effective outer diameter 486 includes those discussed above for average outer diameter 86 of body 72.

Figure 9A:
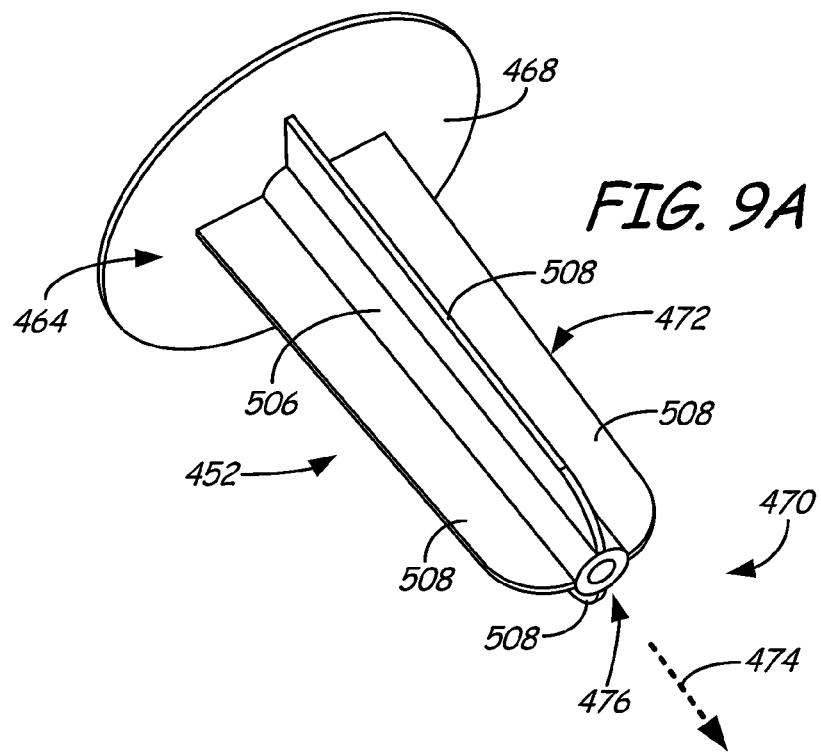
FIG. 9A is a bottom, front perspective view of a fourth alternative payout tube of the present disclosure, which includes four opposing flanges in an X-shaped pattern.
Figure 9B:
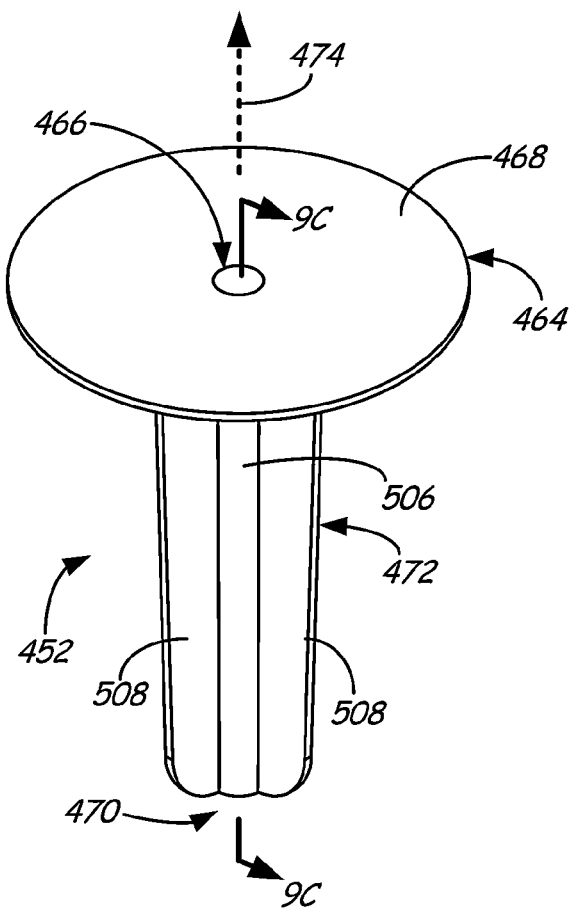
FIG. 9B is a top perspective view of the fourth alternative payout tube.
Figure 9E:
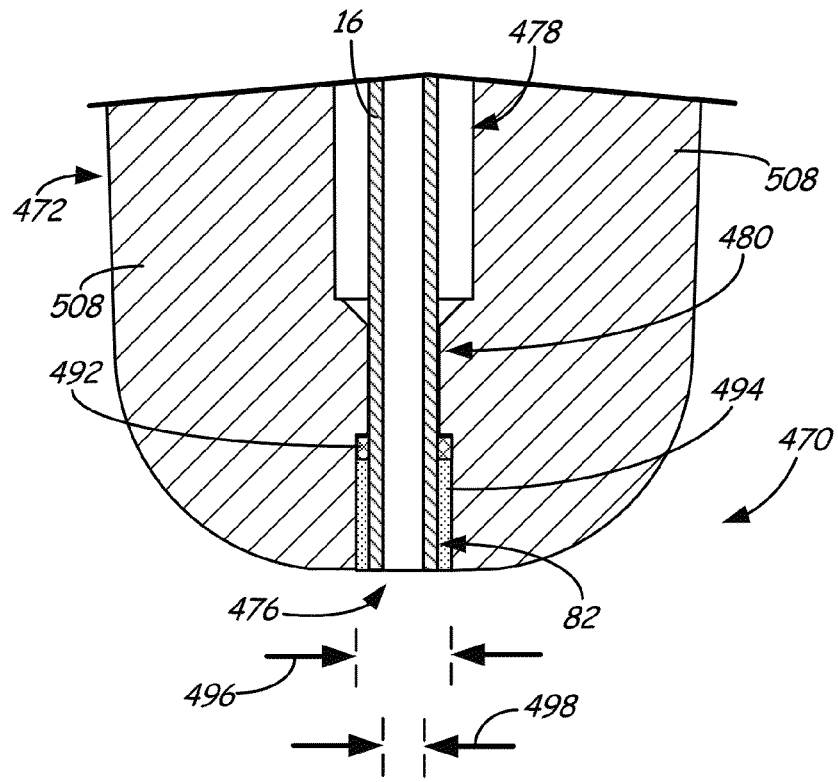
FIG. 9E is an expanded sectional view of a tip end of the fourth alternative payout tube in use with a guide tube.
Figure 9F:
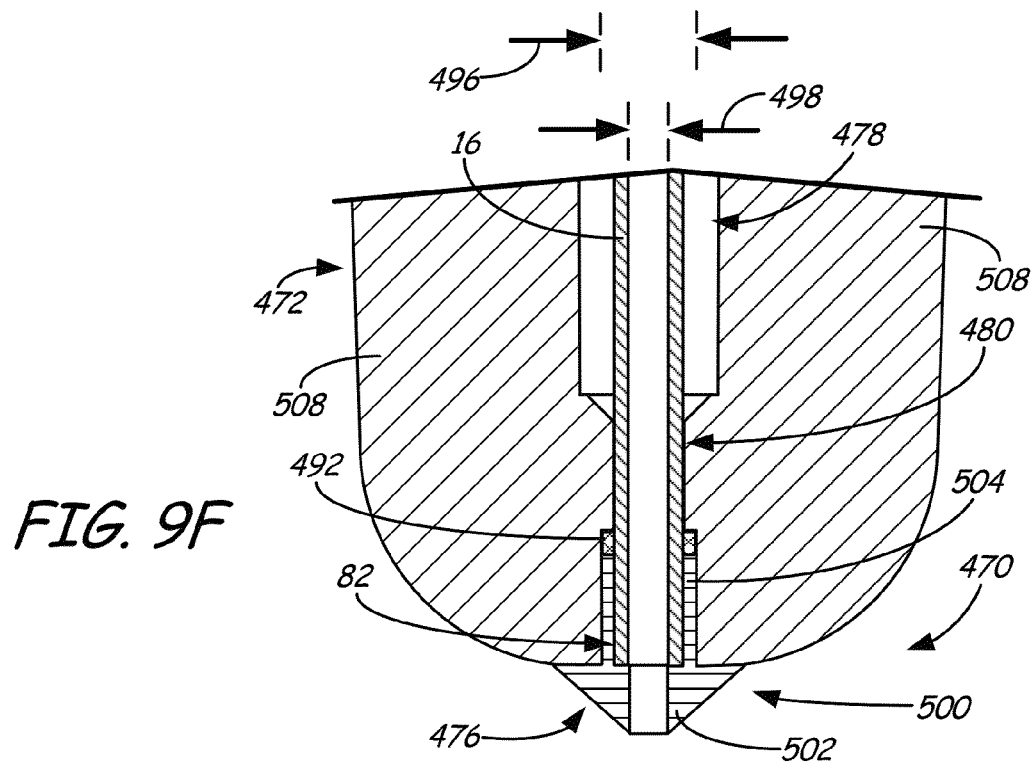
FIG. 9F is an alternative expanded sectional view of a tip end of the fourth alternative payout tube, which includes a capture tip, in use with the guide tube.
Figure 10A:
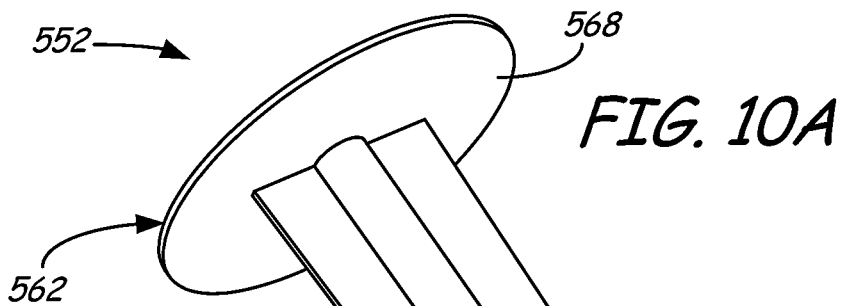
FIG. 10A is a bottom, front perspective view of a fifth alternative payout tube of the present disclosure, which includes two opposing flanges.
Figure 10B:
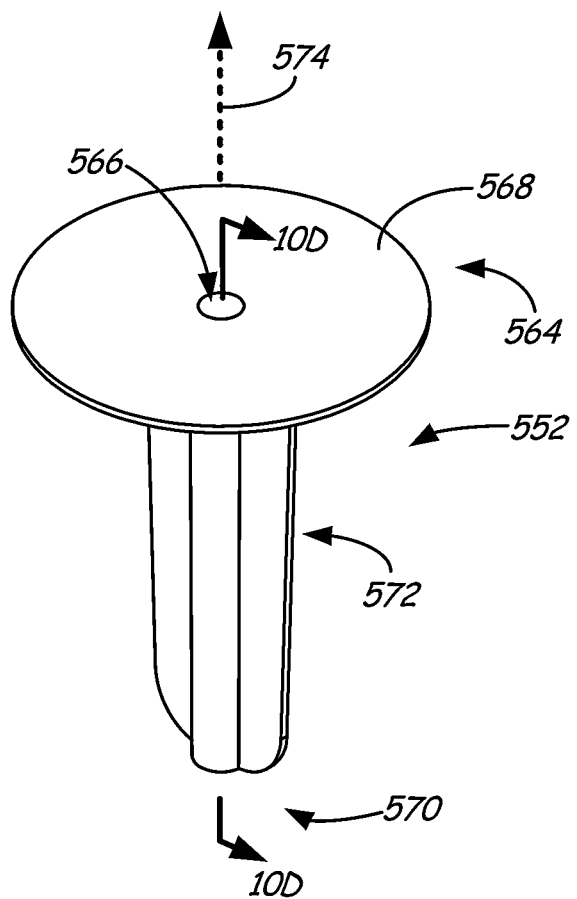
FIG. 10B is a top perspective view of the fifth alternative payout tube.
Figure 10C:
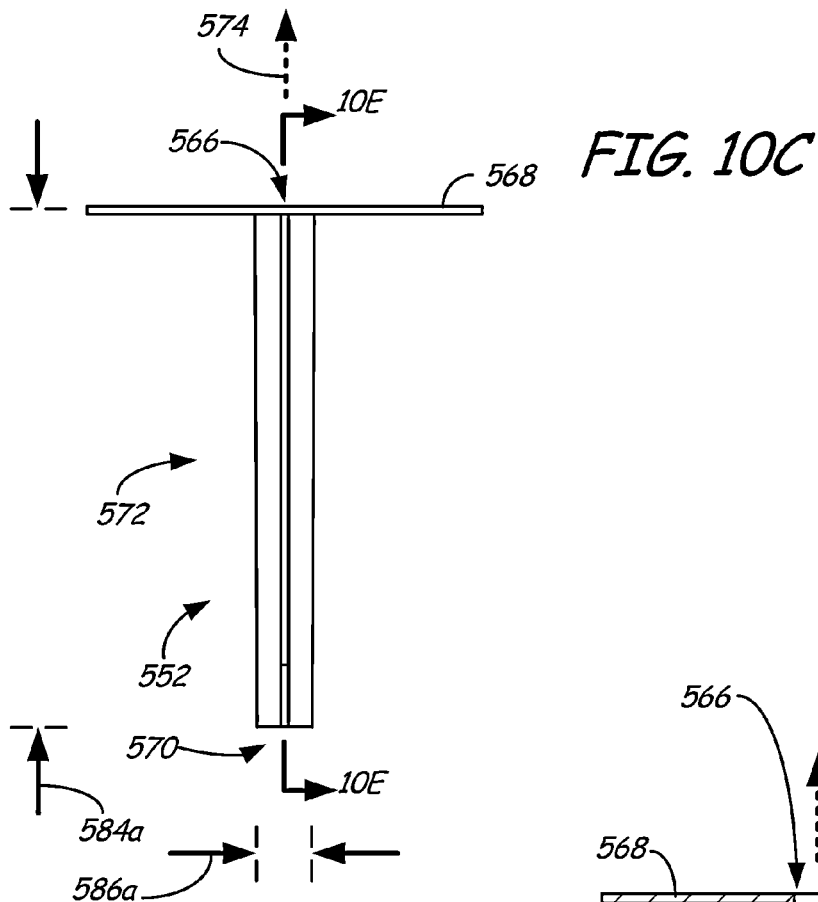
FIG. 10C is a side view of the fifth alternative payout tube.
Figure 10D:
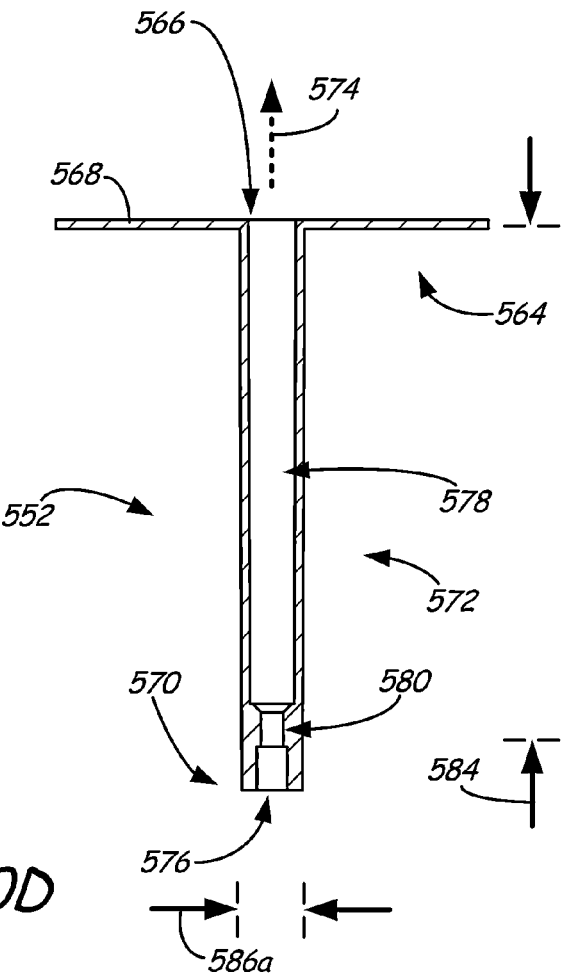
FIG. 10D is a sectional view of the fifth alternative payout tube, taken along Section 10D-10D in FIG. 10B.
Figure 10G:
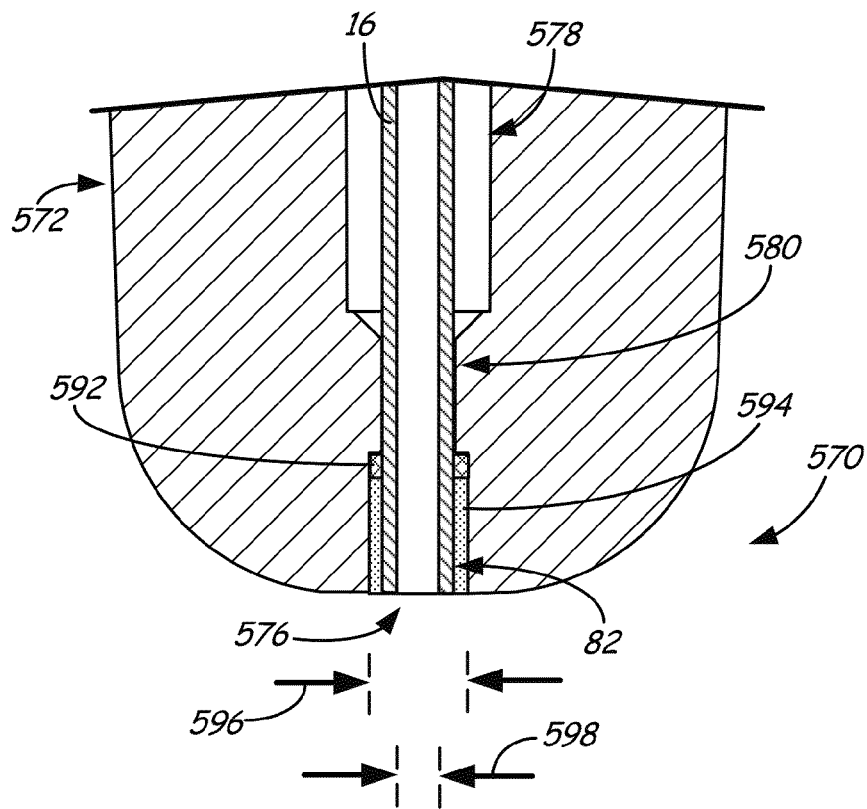
FIG. 10G is an expanded sectional view of a tip end of the fifth alternative payout tube in use with a guide tube.
Figure 10H:
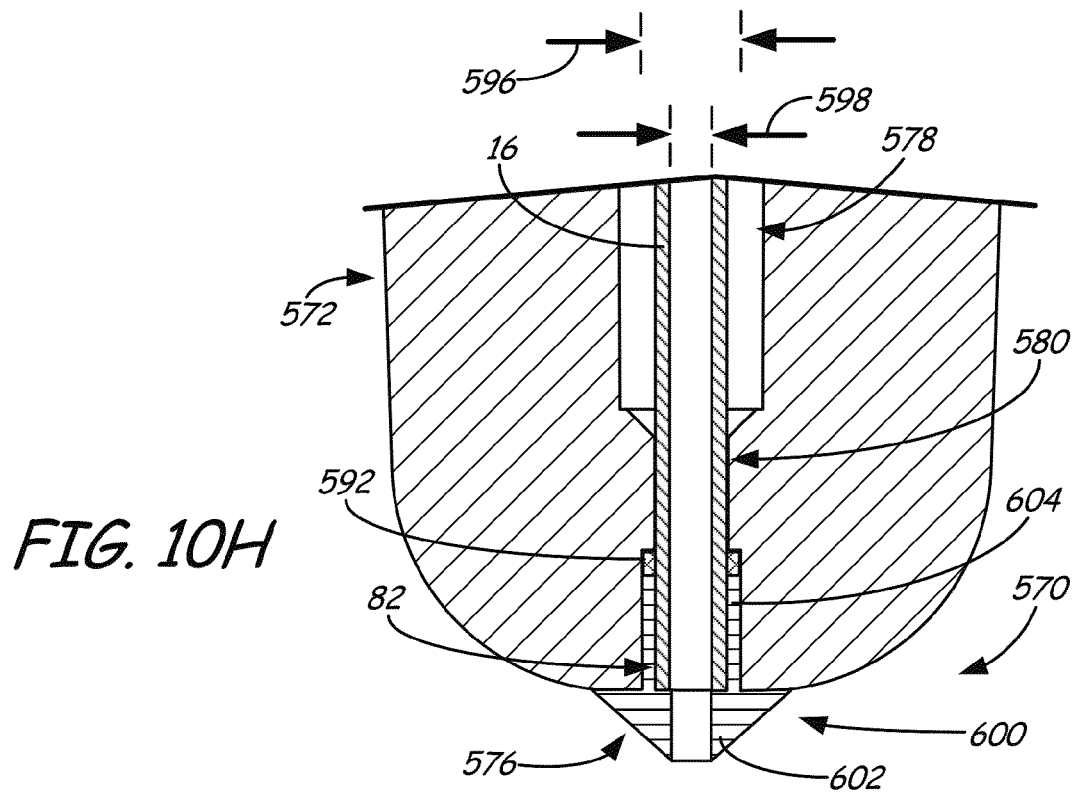
FIG. 10H is an alternative expanded sectional view of a tip end of the fifth alternative payout tube, which includes a capture tip, in use with the guide tube.

The use of average effective outer diameter 486 is suitable for comparison to the effective inner diameter of inlet opening 476 because, for example, it is believed that ribs 508 allow body 472 to function like a conical or cylindrical tube body during the payout of filament 56. As shown in FIGS. 9E and 9F, inlet opening 476 has an effective inner diameter that is substantially less than average effective outer diameter 486 of body 472. This reduces or prevents payout entanglement. Additionally, in this embodiment, outlet opening 466 is substantially the same size as inlet opening 476.

As shown in FIGS. 10A-10H, payout tube 552 is similar to payout tube 352, and also does not have a round outer cross-sectional geometry. In this embodiment, payout tube 552 only includes one pair of ribs 608 that extend in opposing directions from central shaft 606, rather than having four flanges in an X-shaped pattern. The outer cross-sectional dimensions may be based on the diameters of circumscribed circles of the outer geometry, such as circumscribed circles 588 shown in FIG. 10F.

For example, the "average effective outer diameter" of body 572 (referred to as average effective outer diameter 586 may be determined by virtually creating circumscribed circles 588 along the length of body 572, determining the diameters of each of circumscribed circles 588, and averaging the determined diameters. Suitable dimensions for average effective outer diameter 586 includes those discussed above for average outer diameter 86 of body 72.

The use of average effective outer diameter 586 is suitable for comparison to the effective inner diameter of inlet opening 576 because, for example, it is believed that ribs 608 also allow body 572 to function like a conical or cylindrical tube body during the payout of filament 56. As shown in FIGS. 10D-10G, inlet opening 576 has an effective inner diameter that is substantially less than average effective outer diameter 586 of body 572, which reduces or prevents payout entanglement.

Payout tubes 52, 252, 352, 452, and 552 illustrate example embodiments for the payout tubes of the present disclosure, which have inlet openings with effective inner diameters that are substantially less than the average effective outer diameters of the payout tube bodies. Additionally, while payout tubes 52, 252, 352, 452, and 552 described are illustrated with body outer cross-sections that converge from their base ends to their tip ends, in alternative embodiments, the payout tube bodies may have substantially constant outer cross-sections (i.e., cylindrical bodies), or any other suitable outer geometry.

As discussed above, the payout tubes of the present disclosure (e.g., payout tubes 52, 252, 352, 452, and 552) enable payout of filament 56 from coil 54 to print head 18, where print head 18 is a subcomponent of consumable assembly 12. In one alternative embodiment, print head 18 may be a component of system 10, rather than a subcomponent of consumable assembly 12. In this embodiment, the guide tube (e.g., guide tube 16, 216, 316, 416, and 516) may be loaded to print head 18 or another component of system 10.

In another alternative embodiment, the guide tube may also be a component of system 10, rather than a subcomponent of consumable assembly 12. In this embodiment, for example, liner 50 may be penetrated, and guide tube 16 may be inserted through the resulting hole in liner 50 and secured to payout tube 52 for use.

Figure 11A:
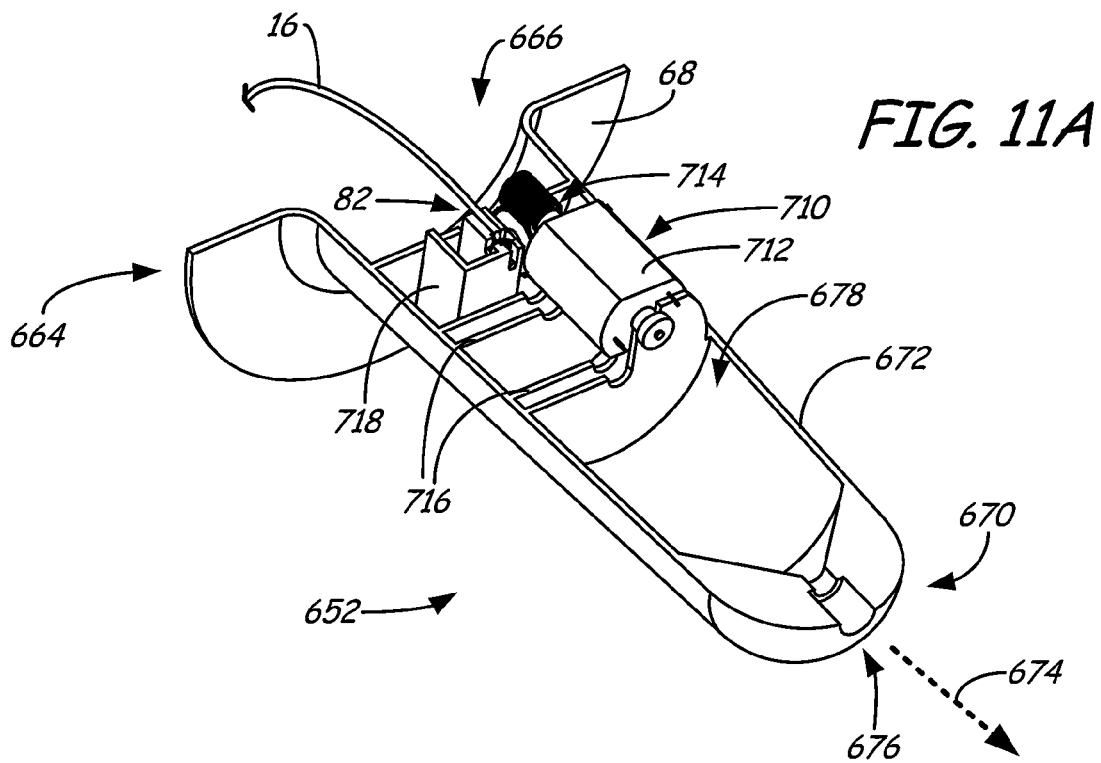
FIG. 11A is a cut bottom, front perspective view of a sixth alternative payout tube of the present disclosure, which includes a filament drive mechanism.

In each of these embodiments, the filament drive mechanism that draws the successive segments of filament 56 is retained by print head 18 and/or system 10. In a further alternative embodiment, the filament drive mechanism may be retained in the payout tube of consumable assembly 12. For example, as shown in FIG. 11A, payout tube 652 includes filament drive mechanism 710 retained within interior region 678. Payout tube 652 may be any suitable payout tube of the present disclosure having sufficient volume within interior region 678 (e.g., payout tubes 52, 252, and 352).

Filament drive mechanism 710 includes motor 712 and capstan assembly 714 retained by support walls 716, where capstan assembly 174 engages and drives successive segments of filament 56 through payout tube 652 via rotational power from motor 712. Examples of suitable designs for motor 712 and capstan assembly 714 include those disclosed in Swanson et al., U.S. patent application Ser. No. 12/976,111. Motor 712 may be powered and controlled by system 10 and/or a portable battery via one or more electrical and/or wireless connections (not shown).

Additionally, in this embodiment, leading end 82 of guide tube 16 is secured to body 672 at retention wall 718, which is adjacent to base end 664 rather than at tip end 670. As such, the effective inner diameter of inlet opening 676 is the same as the inner diameter of inlet opening 676 itself (rather than the inner diameter of guide tube 16).

Figure 11B:
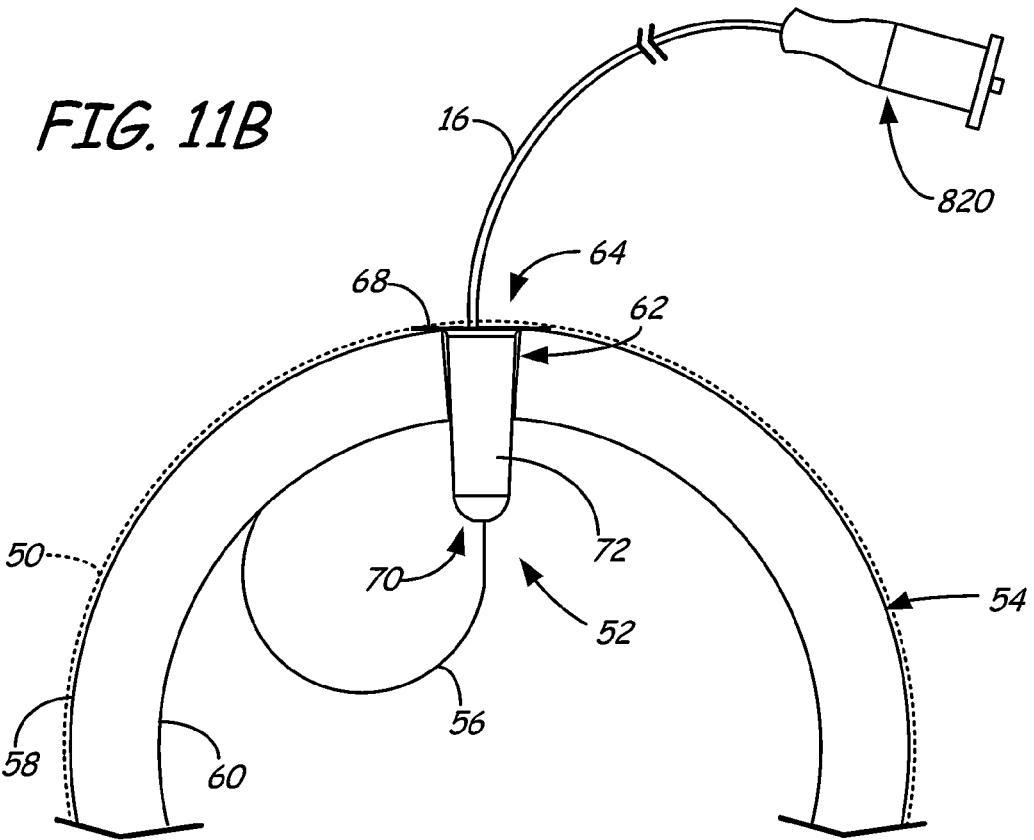
FIG. 11B is a side illustration of the coil, payout tube, guide tube, and liner of an alternative consumable assembly, which also includes a coupling adapter.

FIG. 11B illustrates another embodiment in which print head 18 is replaced with coupling adapter 820, which is configured to engage a reciprocating mating panel of system 10 that is remote from head carriage 36, as discussed in U.S. Publication No. 2013/0164960. In this embodiment, coupling adapter 820 includes a filament drive mechanism (not shown) that draws successive segments of filament 56 from coil 54 and through payout tube 52 (or any other suitable payout tube of the present disclosure, such as payout tubes 252, 352, 454, and 552). As such, guide tube 16 may be secured to the tip end of the payout tube, as discussed above.

The embodiments shown in FIGS. 11A and 11B may be used to as initial feed mechanisms to feed filament 56 from coil 54 to a remote filament drive mechanism retained by the print head of system 10. Upon receipt of filament 56, the filament drive mechanisms retained by consumable assembly 12 may then disengage from filament 56, allowing remote filament drive mechanism of the print head to continue to draw filament 56. Alternatively, filament drive mechanism 710 (shown in FIG. 11A) and coupling adapter 820 (shown in FIG. 11B) may function as the sole filament drive mechanisms for system 10. This embodiment precludes a remote filament drive mechanism retained by the print head, thereby reducing the print head weight that head carriage 36 is required to support and move.

Suitable consumable filaments for filament 56 include those disclosed and listed in Crump et al., U.S. Pat. No. 5,503,785; Lombardi et al., U.S. Pat. Nos. 6,070,107 and 6,228,923; Priedeman et al., U.S. Pat. No. 6,790,403; Comb et al., U.S. Pat. No. 7,122,246; Batchelder, U.S. Patent Application Publication No. 2009/0263582; Hopkins et al., U.S. Patent Application Publication No. 2010/0096072; Batchelder et al., U.S. Patent Application Publication No. 2011/0076496; and Batchelder et al., U.S. Patent Application Publication No. 2011/0076495. Furthermore, the consumable filaments may each include encoded markings, as disclosed in Batchelder et al., U.S. Patent Application Publication Nos. 2011/0117268, 2011/0121476, and 2011/0233804, which may be used with sensor assemblies 44 of system 10.

Filament 56 desirably exhibits physical properties that allow it to be used as a consumable material in system 10. In particular, filament 56 is desirably flexible along its length to allow it to be retained in the figure-8 configuration and to be fed through guide tube 16 without plastically deforming or fracturing. For example, in one embodiment, filament 56 is capable of withstanding elastic strains greater than t/r, where "t" is an average cross-sectional thickness or average diameter of filament 56 in the plane of curvature, and "r" is a bend radius.

However, filament 56 also desirably has suitable thermal properties (e.g., a suitable glass transition temperature) for use in system 10. Increasing flexibility of filament 56, such as with the use of plasticizers, typically reduces the thermal properties of filament 56. As such, to maintain suitable thermal properties, filament 56 is typically stiffer (i.e., less flexible) than many strand materials used with current payout tubes.

Additionally, filament 56 also desirably exhibits low compressibility such that its axial compression doesn't cause filament 56 to be seized within a liquefier of print head 18. Examples of suitable Young's modulus values for the polymeric compositions of filament 56 include modulus values of about 0.2 gigapascals (GPa) (about 30,000 pounds-per-square inch (psi)) or greater, where the Young's modulus values are measured pursuant to ASTM D638-08. In some embodiments, suitable Young's modulus range from about 1.0 GPa (about 145,000 psi) to about 5.0 GPa (about 725,000 psi). In additional embodiments, suitable Young's modulus values range from about 1.5 GPa (about 200,000 psi) to about 3.0 GPa (about 440,000 psi).

In the shown embodiment, filament 56 has a substantially cylindrical geometry (i.e., a substantially circular cross section). In this embodiment, examples of suitable average outer diameters for filament 56 range from about 0.8 millimeters (about 0.03 inches) to about 3.8 millimeters (about 0.15 inches), with particularly suitable average outer diameters ranging from about 1.0 millimeter (about 0.04 inches) to about 2.0 millimeters (about 0.08 inches). In one embodiment, particularly suitable average outer diameters for filament 56 range from about 1.0 millimeter (about 0.04 inches) to about 1.5 millimeters (about 0.06 inches). In another embodiment, particularly suitable average outer diameters for filament 56 range from about 1.5 millimeters (about 0.06 inches) to about 2.0 millimeters (about 0.08 inches). The average outer diameters of filament 56 are based on measurements taken along at least 20 feet of filament 56.

The dimensions of the consumable filaments (e.g., filament 56) may also be referred to based on their outer cross-sectional areas. Accordingly, suitable average outer cross-sectional areas of the consumable filaments range from about 0.5 square millimeters to about 11.3 square millimeters, with particularly suitable average outer cross-sectional areas ranging from about 0.8 square millimeters to about 3.1 square millimeters. In one embodiment, particularly suitable average outer cross-sectional areas of the consumable filaments range from about 0.8 square millimeters to about 1.8 square millimeters. In another embodiment, particularly suitable average outer cross-sectional areas of the consumable filaments range from about 1.8 square millimeters to about 3.1 square millimeters. The average outer cross-sectional areas of filament 56 are also based on measurements taken along at least 20 feet of filament 56.

EXAMPLES

The present disclosure is more particularly described in the following examples that are intended as illustrations only, since numerous modifications and variations within the scope of the present disclosure will be apparent to those skilled in the art. Example payout tubes of the present disclosure and comparative example payout tubes were tested for filament payout reliability with an additive manufacturing system.

Figure 12:
FIG. 12 is a photograph of a test set up for tested payout tubes of the present disclosure and for tested comparative payout tubes.

FIG. 12 illustrates a test set up for each of the tested payout tubes. For each test, a coil of a consumable filament in a figure-8 configuration was laid flat on its side, as shown. The flat orientation of the coil was considered to be a worst case scenario for filament entanglement during payout. For each tested payout tube, the consumable filaments tested included a 1.78-millimeter (0.070-inch) diameter polycarbonate filament, and a 1.78-millimeter (0.070-inch) diameter breakaway support structure filament, each commercially available from Stratasys, Inc., Eden Prairie, Minn. The payout tube was inserted into a payout hole of the coil and a leading end of a guide tube was secured to the payout tube.

The trailing end of the guide tube was connected to a coupling adapter as shown above in FIG. 11B and disclosed in U.S. Publication No. 2013/0164960. The coupling adapter was engaged with a reciprocating mating panel of an additive manufacturing system commercially available from Stratasys, Inc., Eden Prairie, Minn. under the trademarks "FDM" and "FORTUS 400mc".

I. Comparative Examples A and B

As shown in FIG. 13A, the payout tube of Comparative Example A was commercially available from Reelex Packaging Solutions, Inc., Patterson, N.Y. under the trademark "EZ-TUBE" with a flared-end component available under the trademark "SHERGUIDE". With flared-end component, the effective inner diameter of the payout tube of Comparative Example A was greater than its average outer diameter.

As shown in FIG. 14A, the payout tube of Comparative Example B was commercially available from Reelex Packaging Solutions, Inc., Patterson, N.Y. under the trademark "EZ-TUBE", but did not include a flared-end component. As shown in FIG. 14B, the effective inner diameter of the payout tube of Comparative Example A was almost as wide as its average outer diameter.

Figure 13C:
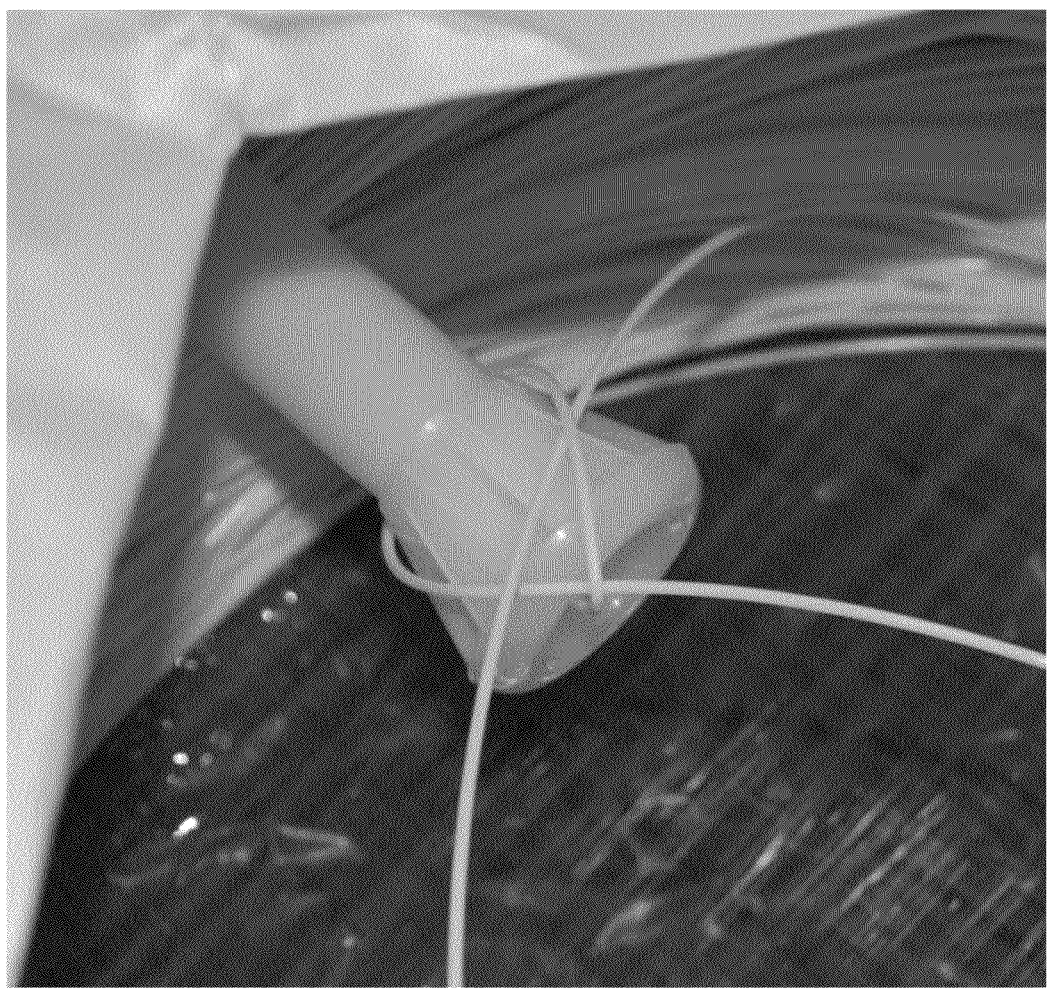

The payout tubes of Comparative Examples A and B depicted situations in which the effective inner diameters of the inlet openings were comparable in size to the average outer diameter of the payout tube body, and were also substantially greater than the diameter of the consumable filaments. While these payout tubes are effective for enabling payout of a variety of material strands, such as wire, rope, and communication cables, each of them repeatedly resulted in tangles of the consumable filaments during the payout tests, as illustrated in FIGS. 13B and 13C (Comparative Example A) and in FIG. 14B (Comparative Example B).

II. Comparative Examples C-E

Figure 15A:
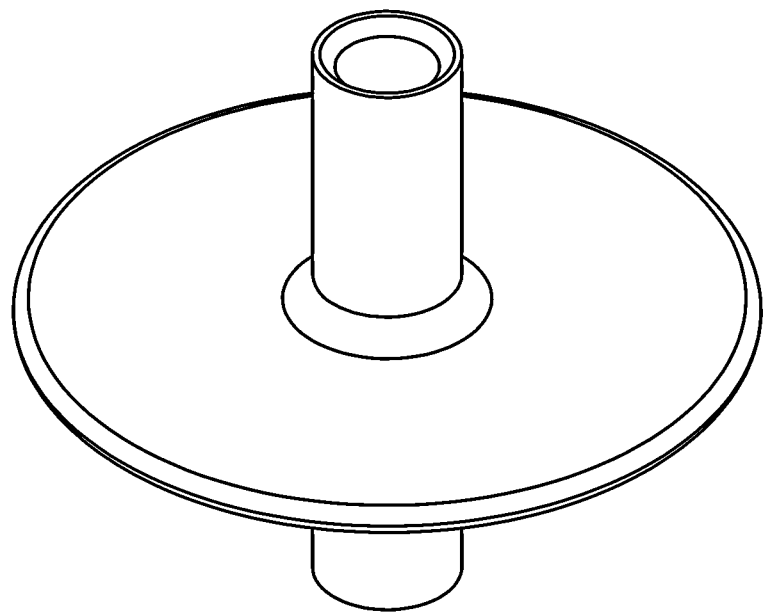
FIG. 15A is top perspective view of a payout tube used for Comparative Examples C-E.
Figure 15B:
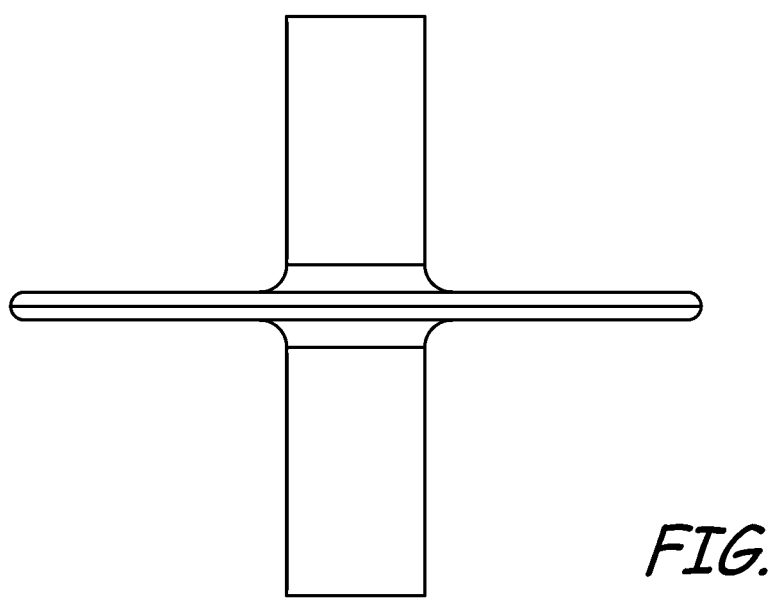
FIG. 15B is side view of the payout tube used for Comparative Examples C-E.

Comparative Examples C-E each incorporated a payout tube shown in FIGS. 15A and 15B, which had symmetrical ends. However, in these comparative examples, a guide tube having an inner diameter of 0.381 millimeters (0.015 inches) (about 214% of the diameter of the consumable filaments) was extended through the payout tube by different lengths. As shown in FIG. 16A, for Comparative Example C, a long segment of a guide tube was extended out of the inlet opening of the payout tube. As shown in FIG. 17A, for Comparative Example D, a medium-length segment of the guide tube was extended out of the inlet opening of the payout tube. As shown in FIG. 18A, for Comparative Example E, a short-length segment of the guide tube was extended out of the inlet opening of the payout tube.

The payout tubes of Comparative Examples D-E depicted situations in which the effective inner diameters of the inlet openings were comparable in size to the average outer diameter of the payout tube body, in this case, the outer diameter of the guide tube. However, the outer diameter of the guide tube was not substantially greater than its effective inner diameter. Each of these payout tube assemblies repeatedly resulted in tangles of the consumable filaments during the payout tests, as illustrated in FIG. 16B (Comparative Example C), in FIG. 17B (Comparative Example D), and in FIG. 18B (Comparative Example E).

III. Comparative Example F

Figure 19A:
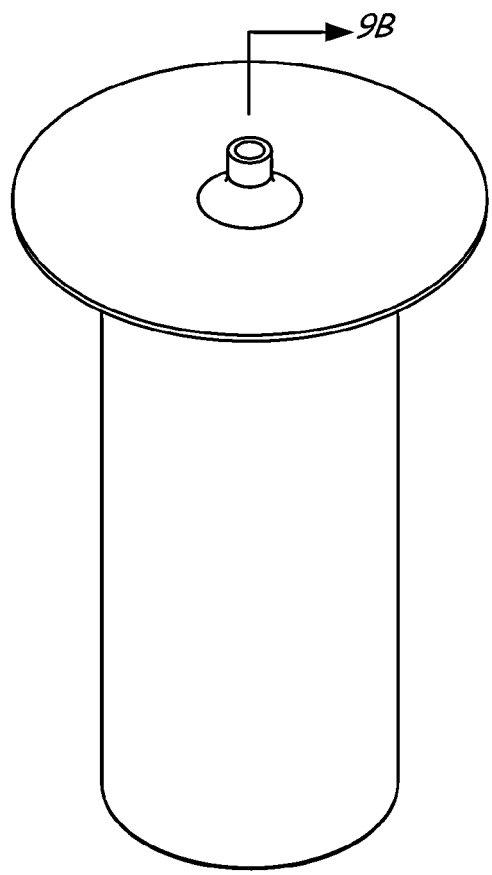
FIG. 19A is top perspective view of a payout tube of Comparative Example F.
Figure 19B:
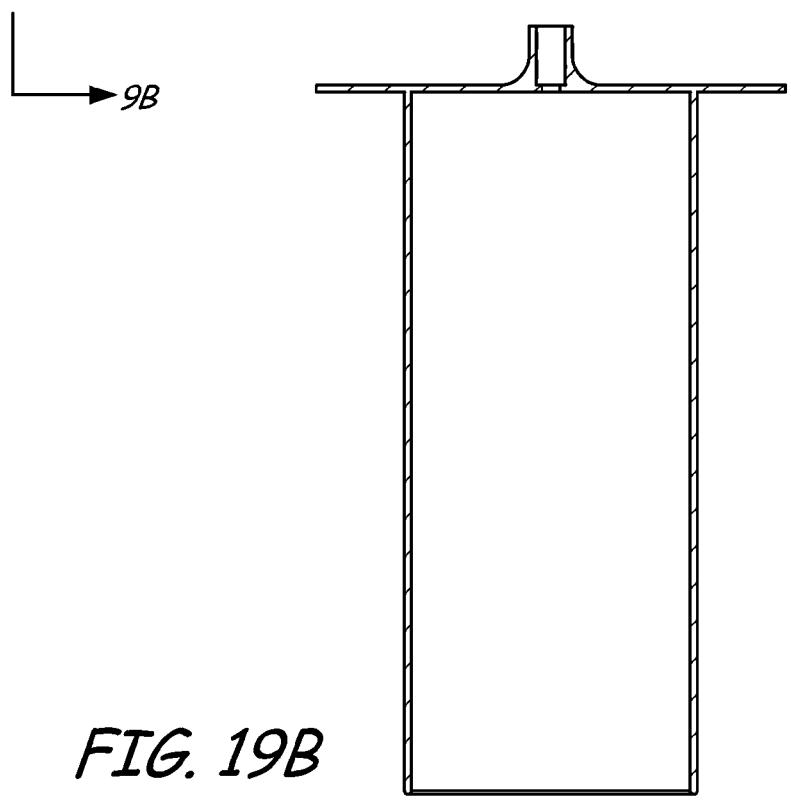
FIG. 19B is sectional view of the payout tube of Comparative Example F, taken along Section 19B-19B in FIG. 19A.

Comparative Example F incorporated a payout tube shown in FIG. 19A-19C, which included a large outer diameter and an inlet opening with an effective inner diameter that was comparable in size to the outer diameter. This payout tube also depicted a situation in which the effective inner diameter of the inlet opening was comparable in size to the average outer diameter of the payout tube body, and was also substantially greater than the diameter of the consumable filaments. This payout tube repeatedly resulted in tangles of the consumable filaments during the payout tests, as illustrated in FIG. 19D.

IV. Examples 1-6

As shown in FIG. 20A, the payout tube of Example 1 corresponded to payout tube 52 (best shown in FIGS. 5A-5D) with the guide tube secured to the inlet opening with an e-clip and adhesive. This payout tube was successful in repeatedly paying out the consumable filaments during the payout tests, as illustrated in FIG. 20B.

During successive tests on the payout tube of Example 1, it was found that excess adhesive located at the tip end of the payout tube enhanced the shelf effect at the inlet opening, which occasionally caused the consumable filament to be caught. As discussed above, a capture tip with the sloped surface eliminated surfaces at the inlet opening that were perpendicular to the direction of movement of the consumable filament.

As shown in FIG. 21A, the payout tube of Example 2 corresponded to payout tube 52 with capture tip 100 (shown in FIGS. 6A-6C) with the guide tube secured to the inlet opening with an e-clip and the capture tip. This payout tube was also successful in repeatedly paying out the consumable filaments during the payout tests, as illustrated in FIGS. 21A and 21B. It is further believed that the capture tip is beneficial for use with any of the payout tubes of the present disclosure.

As shown in FIG. 22A, the payout tube of Example 3 corresponded to payout tube 252 (best shown in FIGS. 7A-7D) with the guide tube secured to the inlet opening with an e-clip and adhesive. This payout tube was also successful in repeatedly paying out the consumable filaments during the payout tests, as illustrated in FIG. 22B.

Figure 23A:
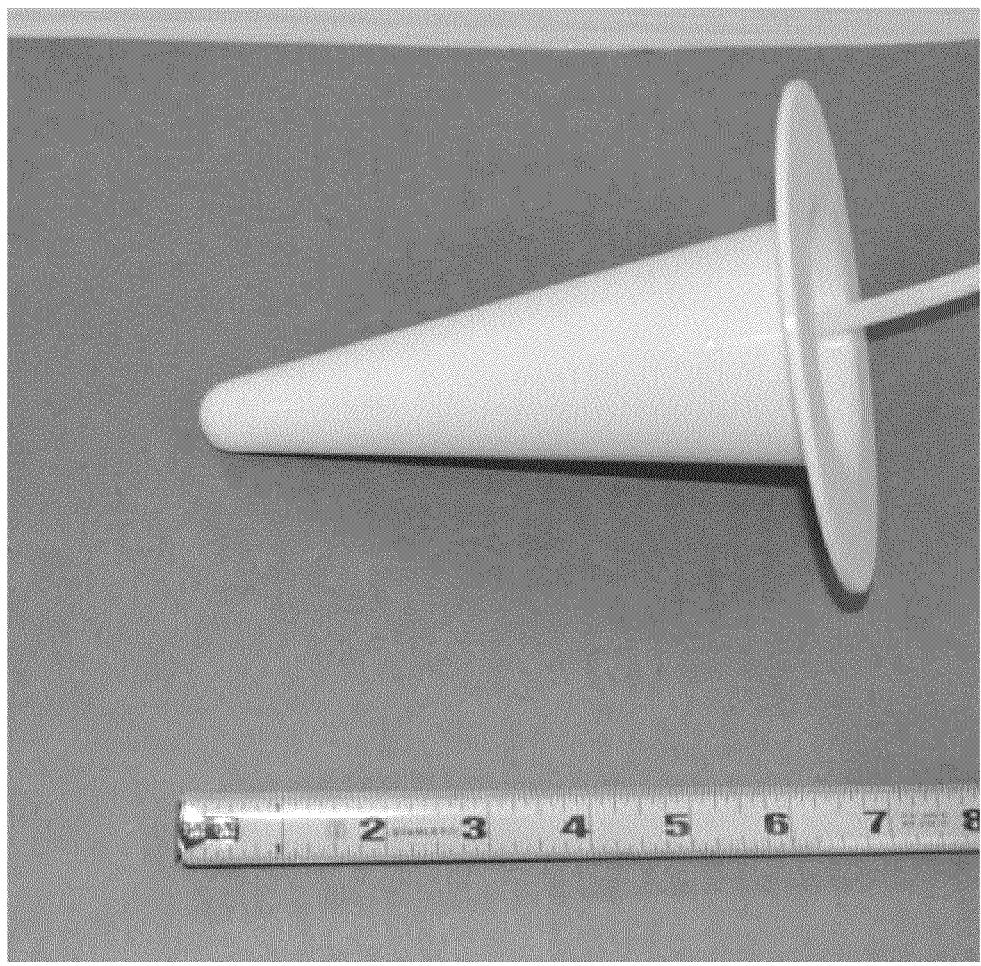
FIG. 23A is a photograph of the tested payout tube of Example 4 of the present disclosure.
Figure 23B:
FIG. 23B is a photograph of payout test results for the payout tube of Example 4.

As shown in FIG. 23A, the payout tube of Example 4 corresponded to payout tube 352 (best shown in FIGS. 8A-8D) having the sharp-sloped outer geometry, with the guide tube secured to the inlet opening with an e-clip and adhesive. This payout tube was also successful in repeatedly paying out the consumable filaments during the payout tests, as illustrated in FIG. 23B.

As shown in FIG. 24A, the payout tube of Example 5 corresponded to payout tube 352 (best shown in FIGS. 9A-9E) having the X-shaped-ribbed outer geometry, with the guide tube secured to the inlet opening with an e-clip and adhesive. This payout tube was also successful in repeatedly paying out the consumable filaments during the payout tests, as illustrated in FIG. 24B.

As shown in FIG. 25A, the payout tube of Example 6 corresponded to payout tube 352 (best shown in FIGS. 10A-10G) having the opposing-ribbed outer geometry, with the guide tube secured to the inlet opening with an e-clip and adhesive. This payout tube was also successful in repeatedly paying out the consumable filaments during the payout tests, as illustrated in FIG. 25B.

The payout tubes of Examples 1-6 each depicted an embodiment in which the effective inner diameter of the inlet opening was same as the inner diameter of the guide tube, which was 0.381 millimeters (0.015 inches) (about 214% of the diameter of the consumable filaments). Additionally, for each payout tube of Examples 1-6, the effective inner diameter of the inlet opening was substantially smaller than the average effective outer diameter of the payout tube body. This combination of a small effective inner diameter and substantially larger average effective outer diameter enabled payout of the consumable filaments without payout entanglement. This allowed successive segments of the consumable filaments to be fed from the consumable assembly to the additive manufacturing system without interruption.

Effective payout coils of the consumable filament (in a figure-8 configuration) opens the door to consumable assemblies having larger volumes of the consumable filaments. This is because, unlike spools of filaments in which the weight of the filaments increase the rotational friction of the spools (which could break the filaments), the payout of the consumable filament from the coil is not affected by the size of the coil. This allows the consumable assembly to be any desired size, such as from small coils (e.g., hand-sized coils) to large coils (e.g., palette-sized coils), allowing the printing runs of different durations to be uninterrupted.

The terms "about" and "substantially" are used herein with respect to measurable values and ranges due to expected variations known to those skilled in the art (e.g., limitations and variabilities in measurements). Although the present disclosure has been described with reference to preferred embodiments, workers skilled in the art will recognize that changes may be made in form and detail without departing from the spirit and scope of the disclosure.

The invention claimed is:

1. A consumable assembly for use with an additive manufacturing system, the consumable assembly comprising:
   a coil of a consumable filament having a payout hole extending from an inner layer of the coil to an outer layer of the coil;
   a payout tube extending through the payout hole in the coil, the payout tube comprising:
      a tip end extending beyond the payout hole at the inner layer of the coil, and having an inlet opening with an effective inner diameter less than about 7.6 millimeters, wherein the inlet opening also has a cross-sectional area ranging from about 110% to about 300% of an average cross-sectional area of the consumable filament;
      a base end having an outlet opening; and
      a tube body extending along a longitudinal length between the tip end and the base end, the tube body having an average effective outer diameter along the longitudinal length that is at least about three times greater than the effective inner diameter of the inlet opening; and
   a filament drive mechanism retained within the tube body, wherein the filament drive mechanism comprises an electrically-powered motor, and wherein the filament drive mechanism is configured to feed successive segments of the consumable filament through the payout tube.

2. The consumable assembly of claim 1, wherein longitudinal length of the tube body ranges from about 130 millimeters to about 250 millimeters, and wherein the average effective outer diameter ranges from about 38 millimeters to about 130 millimeters.

3. The consumable assembly of claim 1, wherein the tube body has an outer geometry that is cylindrical or conical between the tip end and the base end.

4. The consumable assembly of claim 1, wherein the tube body has an outer geometry that comprises a plurality of ribs that extend along the longitudinal length between the tip end and the base end.

5. The consumable assembly of claim 1, wherein the payout tube further comprises a capture tip secured to the tip end of the tube body at least partially within the inlet opening, wherein the effective inner diameter of the inlet opening is an inner diameter of the capture tip, and wherein the capture tip has a surface that is sloped outward in a direction of movement of the consumable filament into the inlet opening.

6. The consumable assembly of claim 1, and further comprising a collar extending from the tube body at the base end, the collar extending substantially perpendicular to the longitudinal length.

7. The consumable assembly of claim 1, and further comprising a flexible guide tube having a first end secured within the tube body, a second end located outside of the tube body, and a segment between the first end and the second end that extends through the outlet opening.

8. The consumable assembly of claim 1, and further comprising a moisture-resistant liner encasing the coil.

9. A consumable assembly for use with an additive manufacturing system, the consumable assembly comprising:
   a coil of a consumable filament having a payout hole extending from an inner layer of the coil to an outer layer of the coil;
   a payout tube extending through the payout hole in the coil, the payout tube comprising:
      a tip end extending beyond the payout hole at the inner layer of the coil, and having an inlet opening with an inner diameter less than about 7.6 millimeters, and that also ranges from about 110% to about 300% of an average diameter of the consumable filament;

a base end having an outlet opening with an inner diameter that is at least as great as the inner diameter of the inlet opening; and a tube body extending along a longitudinal length between the tip end and the base end, the tube body having an average outer diameter along the longitudinal length that is at least about three times greater than the inner diameter of the inlet opening; and a filament drive mechanism secured within the tube body between the tip end and the base end, wherein the filament drive mechanism comprises an electrically-powered motor, and is configured to feed successive segments of the consumable filament through the payout tube.

10. The consumable assembly of claim 9, and further comprising a flexible guide tube having a first end secured within the tube body, a second end located outside of the tube body, and a segment between the first end and the second end that extends through the outlet opening.

11. The consumable assembly of claim 9, wherein the inner diameter of the inlet opening ranges from about 150% to about 275% of the average diameter of the consumable filament.

12. The consumable assembly of claim 9, and further comprising a moisture-resistant liner encasing the coil.

13. The consumable assembly of claim 9, and further comprising a collar extending from the tube body at the base end, the collar extending substantially perpendicular to the longitudinal length.

14. A consumable assembly for use with an additive manufacturing system, the consumable assembly comprising:

a coil of a consumable filament retained in a figure-8 configuration, and having a payout hole extending from an inner layer of the coil to an outer layer of the coil, wherein the consumable filament has an average cross-sectional area ranging from about 0.5 square millimeters to about 11.3 square millimeters; and a payout tube comprising:
  a tip end extending beyond the payout hole at the inner layer of the coil, wherein the tip end has an inlet opening with a cross-sectional area ranging from about 110% to about 300% of the average cross-sectional area of the consumable filament;
  a base end extending beyond the payout hole at the outer layer of the coil, wherein the base end has an outlet opening; and
  a tube body disposed through the payout hole, and extending along a longitudinal length between the tip end and the base end, the tube body having an average effective outer diameter along the longitudinal length that is at least about three times greater than the effective inner diameter of the inlet opening; and a filament drive mechanism secured within the tube body between the tip end and the base end, wherein the filament drive mechanism comprises an electrically-powered motor, and is configured to feed successive segments of the consumable filament through the payout tube; and a flexible guide tube comprising:
  a first end secured within the tube body;
  a second end located outside of the tube body; and
  a segment between the first end and the second end that extends through the outlet opening.

15. The consumable assembly of claim 14, and further comprising a moisture-resistant liner encasing the coil.

16. The consumable assembly of claim 14, wherein the inlet opening of the payout tube is substantially circular, and wherein the effective cross-sectional area of the inlet opening corresponds to an effective inner diameter that is less than 7.6 millimeters.

17. The consumable assembly of claim 14, wherein the tube body has an outer geometry that is substantially cylindrical or substantially conical between the tip end and the base end.

18. The consumable assembly of claim 14, wherein the consumable filament has an average cross-sectional area ranging from about 0.8 square millimeters to about 3.1 square millimeters, and wherein the cross-sectional area of the inlet opening ranges from about 150% to about 275% of the average cross-sectional area of the consumable filament.

19. The consumable assembly of claim 14, wherein the payout tube further comprises a capture tip secured to the tip end of the tube body at least partially within the inlet opening, wherein the cross-sectional area of the inlet opening is an inner cross-sectional area of the capture tip, and wherein the capture tip has a surface that is sloped outward in a direction of movement of the consumable filament into the inlet opening.

20. The consumable assembly of claim 14, wherein the first end of the flexible guide tube is secured within the tube body at the tip end of the payout tube.

* * * * *